(12) United States Patent
Park et al.

(10) Patent No.: US 12,114,305 B2
(45) Date of Patent: Oct. 8, 2024

(54) METHOD FOR PERFORMING UPLINK TRANSMISSION IN WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 571 days.

(21) Appl. No.: 17/422,119

(22) PCT Filed: Jan. 9, 2020

(86) PCT No.: PCT/KR2020/000377
§ 371 (c)(1),
(2) Date: Jul. 9, 2021

(87) PCT Pub. No.: WO2020/145676
PCT Pub. Date: Jul. 16, 2020

(65) Prior Publication Data
US 2022/0116965 A1  Apr. 14, 2022

Related U.S. Application Data

(60) Provisional application No. 62/791,021, filed on Jan. 10, 2019.

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0051* (2013.01); *H04W 16/28* (2013.01);
(Continued)

(58) Field of Classification Search
CPC ..... H04L 5/0051; H04L 5/0007; H04L 5/001; H04L 5/0023; H04L 5/0048; H04L 5/005;
(Continued)

(56) References Cited

U.S. PATENT DOCUMENTS 11,848,736 B2 * 12/2023 Davydov ............. H04B 7/0626
2013/0242895 A1 * 9/2013 Chen .................... H04W 72/04
370/329

(Continued)

FOREIGN PATENT DOCUMENTS

WO   2018204340   11/2018

OTHER PUBLICATIONS

PCT International Application No. PCT/KR2020/000377, International Search Report dated Apr. 24, 2020, 4 pages.
(Continued)

*Primary Examiner* — Dung B Huynh
(74) *Attorney, Agent, or Firm* — LEE, HONG, DEGERMAN, KANG & WAIMEY

(57) ABSTRACT

The present specification discloses a method and an apparatus for transmitting/receiving a physical uplink shared channel in a wireless communication system. Specifically, a method in which a terminal transmits a physical uplink shared channel (PUSCH) in a wireless communication system comprises the steps of: receiving configuration information related to transmission of the PUSCH; receiving downlink control information that schedules the PUSCH, the downlink control information comprising information that indicates a downlink reference signal (DL RS) related to a beam for transmission of the PUSCH; and transmitting the PUSCH by using the beam.

17 Claims, 15 Drawing Sheets

(a)

(b)

(51) Int. Cl.
*H04W 16/28* (2009.01)
*H04W 56/00* (2009.01)
*H04W 72/23* (2023.01)
*H04W 72/542* (2023.01)

(52) U.S. Cl.
CPC ......... *H04W 56/001* (2013.01); *H04W 72/23* (2023.01); *H04W 72/542* (2023.01)

(58) Field of Classification Search
CPC .. H04L 5/0053; H04W 16/28; H04W 56/001; H04W 72/1268; H04W 72/23; H04W 72/542; H04B 7/0628; H04B 7/0639
See application file for complete search history.

(56) References Cited

U.S. PATENT DOCUMENTS

| | | | | |
|---|---|---|---|---|
| 2014/0213250 A1* | 7/2014 | Baek | ...................... | H04W 76/14 455/434 |
| 2015/0142986 A1* | 5/2015 | Reznik | .................... | H04L 69/24 709/228 |
| 2015/0326299 A1* | 11/2015 | Petersson | ............. | H01Q 21/061 370/329 |
| 2017/0078065 A1* | 3/2017 | Nam | ...................... | H04L 5/0078 |
| 2018/0102817 A1* | 4/2018 | Park | ...................... | H04B 7/0417 |
| 2018/0206132 A1 | 7/2018 | Guo et al. | | |
| 2018/0234959 A1* | 8/2018 | Ahn | ...................... | H04W 72/20 |
| 2018/0331727 A1* | 11/2018 | John Wilson | ........ | H04W 72/046 |
| 2019/0109679 A1* | 4/2019 | Liu | ...................... | H04B 7/0404 |
| 2019/0261349 A1* | 8/2019 | Ren | ...................... | H04W 72/541 |
| 2019/0349057 A1* | 11/2019 | Davydov | ............ | H04B 7/0658 |
| 2019/0357205 A1* | 11/2019 | Li | ........................ | H04B 7/0697 |
| 2019/0373602 A1* | 12/2019 | Qin | ...................... | H04B 7/0404 |
| 2019/0386731 A1* | 12/2019 | Zhang | .................. | H04L 5/0007 |
| 2020/0100088 A1* | 3/2020 | Kim | ...................... | H04W 48/16 |
| 2020/0112349 A1* | 4/2020 | Yang | .................... | H04B 7/0404 |
| 2020/0162289 A1* | 5/2020 | Ahn | ................... | H04L 25/0224 |
| 2020/0163059 A1* | 5/2020 | Zhang | ................ | H04L 25/0226 |
| 2020/0178048 A1* | 6/2020 | Kim | .................... | H04W 12/062 |
| 2020/0187128 A1* | 6/2020 | Yao | .................... | H04W 52/242 |
| 2020/0221298 A1* | 7/2020 | Pan | ....................... | H04W 12/50 |
| 2020/0235899 A1* | 7/2020 | Gao | .................... | H04L 25/0226 |
| 2020/0244320 A1* | 7/2020 | Wang | ................... | H04B 7/0626 |
| 2020/0244335 A1* | 7/2020 | Nilsson | ................ | H04B 7/0695 |
| 2020/0267582 A1* | 8/2020 | Chen | ..................... | H04B 7/063 |
| 2020/0280409 A1* | 9/2020 | Grant | .................... | H04L 5/0044 |
| 2020/0313815 A1* | 10/2020 | Sridharan | ............ | H04B 7/0689 |
| 2020/0336264 A1* | 10/2020 | Faxér | ................... | H04B 7/0617 |
| 2020/0395981 A1* | 12/2020 | Petersson | ................ | H04L 5/005 |
| 2021/0036895 A1* | 2/2021 | Huang | ................ | H04L 25/0226 |
| 2021/0051608 A1* | 2/2021 | Sridharan | ........... | H04L 25/0226 |
| 2021/0083725 A1* | 3/2021 | Miao | ................... | H04B 7/0619 |
| 2021/0132971 A1* | 5/2021 | Szwed | ................ | G06F 9/45545 |
| 2021/0153143 A1* | 5/2021 | Sridharan | ............ | H04B 7/0404 |
| 2021/0160104 A1* | 5/2021 | Wu | ....................... | H04L 5/0007 |
| 2021/0288708 A1* | 9/2021 | Davydov | ............ | H04B 7/0623 |
| 2021/0329591 A1* | 10/2021 | Hwang | ................ | H04W 68/02 |
| 2021/0329673 A1* | 10/2021 | Gao | .................... | H04L 25/0226 |
| 2021/0351827 A1* | 11/2021 | Hao | ..................... | H04B 7/0639 |
| 2021/0351829 A1* | 11/2021 | Kakishima | ............ | H04W 16/28 |
| 2021/0351888 A1* | 11/2021 | Park | ..................... | H04W 72/51 |
| 2021/0360594 A1* | 11/2021 | Park | ..................... | H04B 7/0695 |
| 2021/0367724 A1* | 11/2021 | Zhang | .................. | H04L 5/0048 |
| 2022/0021420 A1* | 1/2022 | Liu | ..................... | H04B 7/0413 |
| 2022/0123914 A1* | 4/2022 | Gao | .................... | H04B 7/0626 |
| 2022/0217592 A1* | 7/2022 | Cirik | ................ | H04W 36/0069 |
| 2023/0247618 A1* | 8/2023 | Yuan | .................... | H04W 48/16 370/328 |
| 2023/0403108 A1* | 12/2023 | Grossmann | ............ | H04L 5/001 |

OTHER PUBLICATIONS

LG Electronics, "Discussion on multi-beam operations and enhancements," 3GPP TSG RAN WG1 Meeting #94bis, R1-1810303, Oct. 2018, 8 pages.

Qualcomm Incorporated, "Full Tx power for UL transmissions," 3GPP TSG RAN WG1 Meeting #95, R1-1813897, Nov. 2018, 10 pages.

Huawei, et al., "Discussion on UL MIMO transmission," 3GPP TSG RAN WG1 Meeting #87, R1-1611235, Nov. 2018, 8 pages.

* cited by examiner

[FIG. 1]
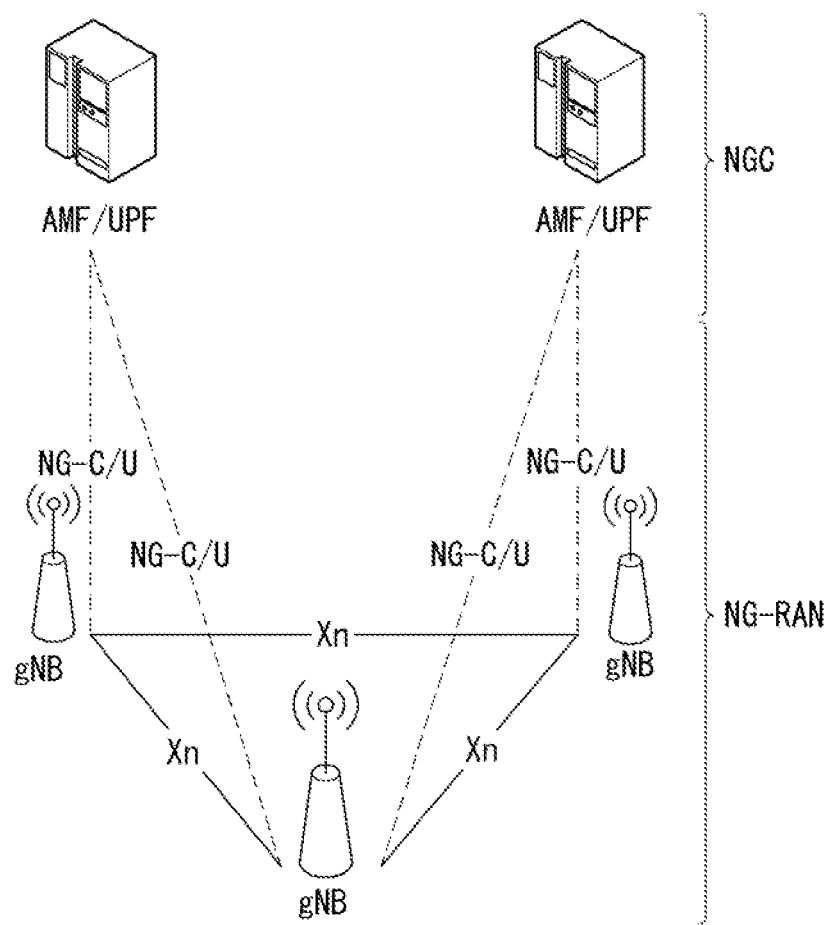

[FIG. 2]
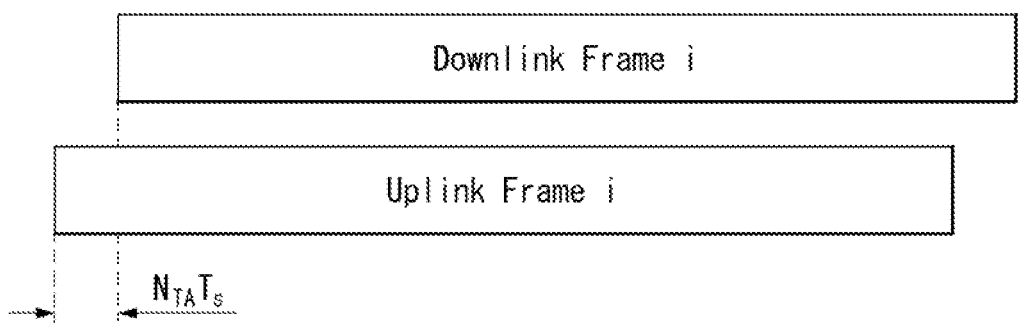

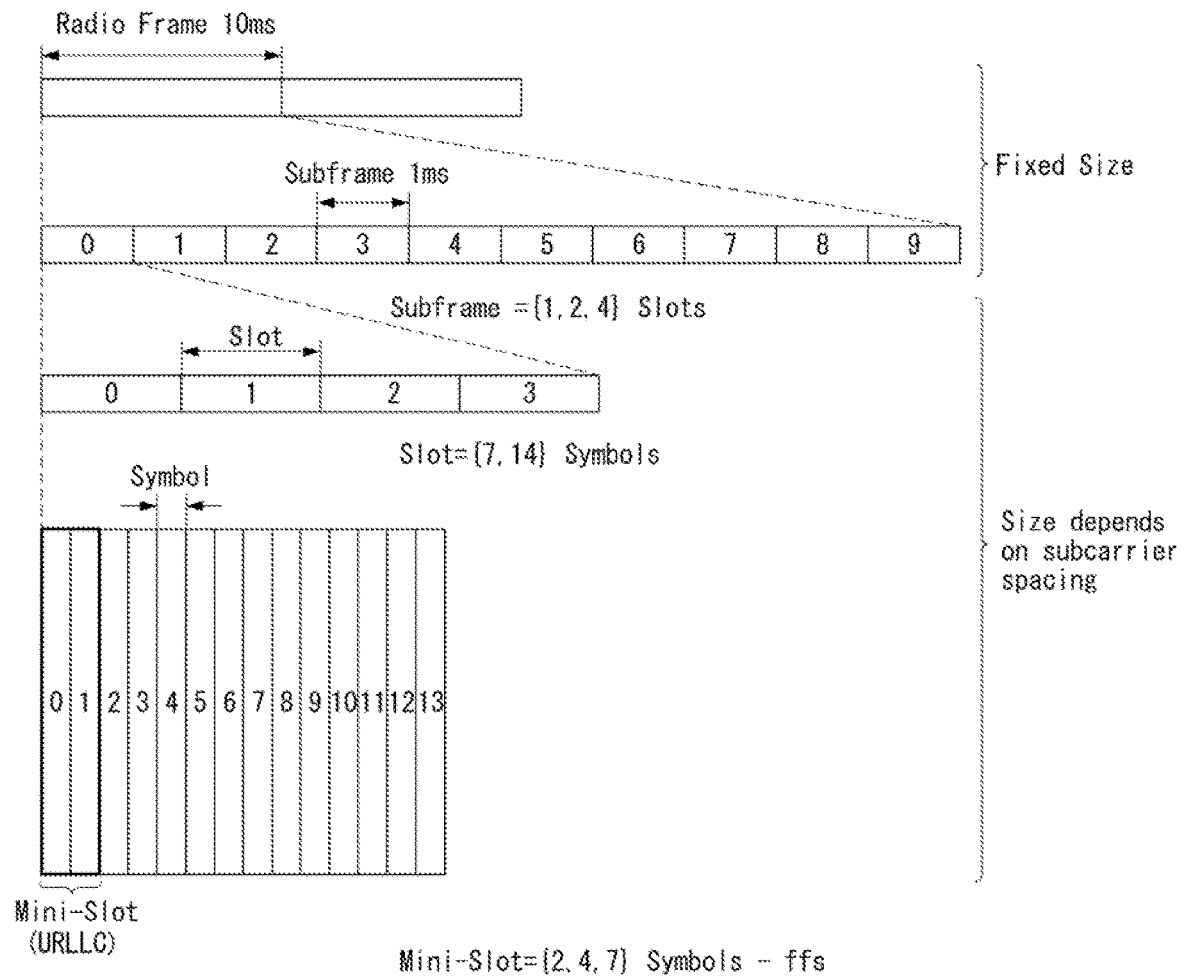
[FIG. 3]

[FIG. 4]
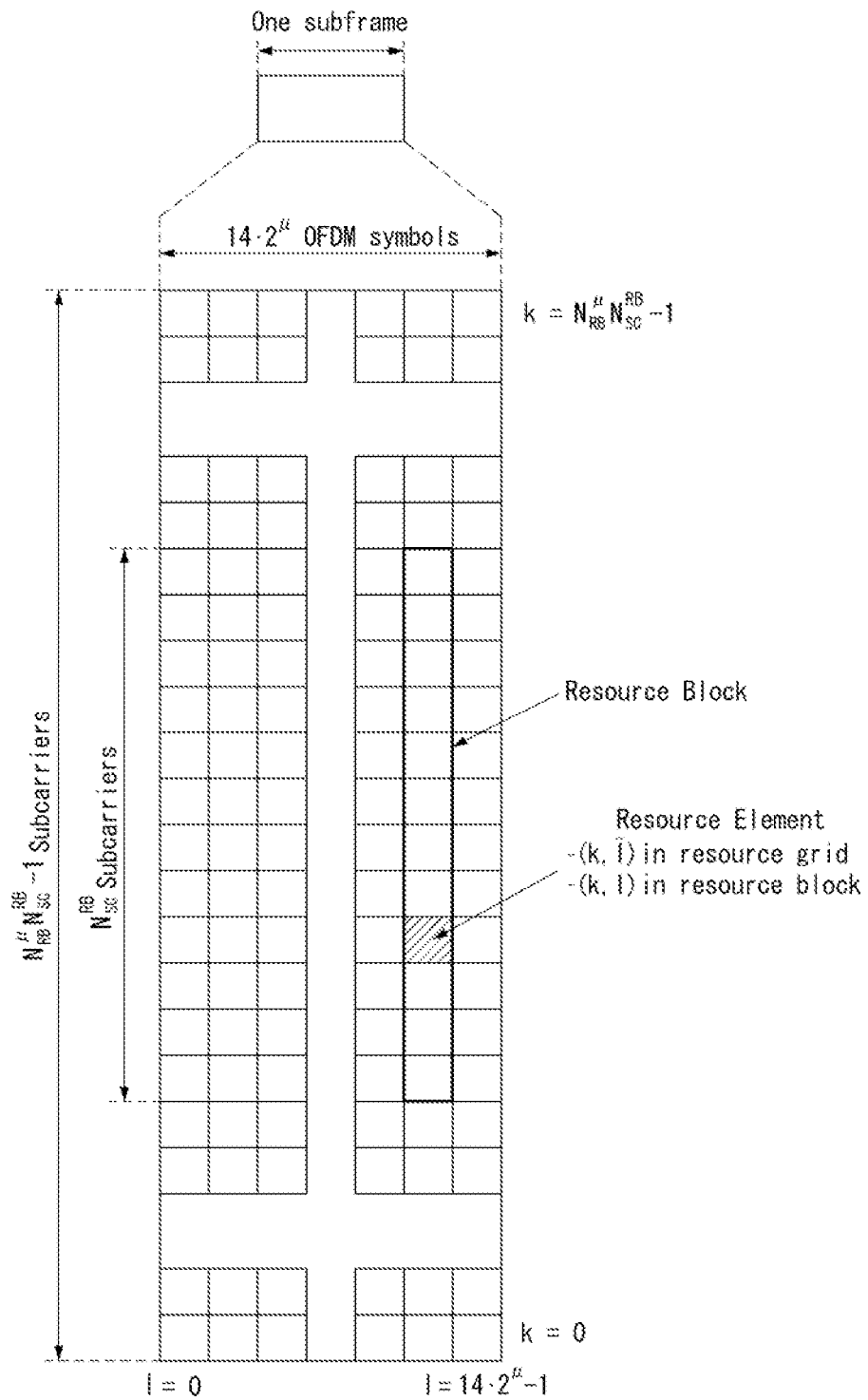

[FIG. 5]
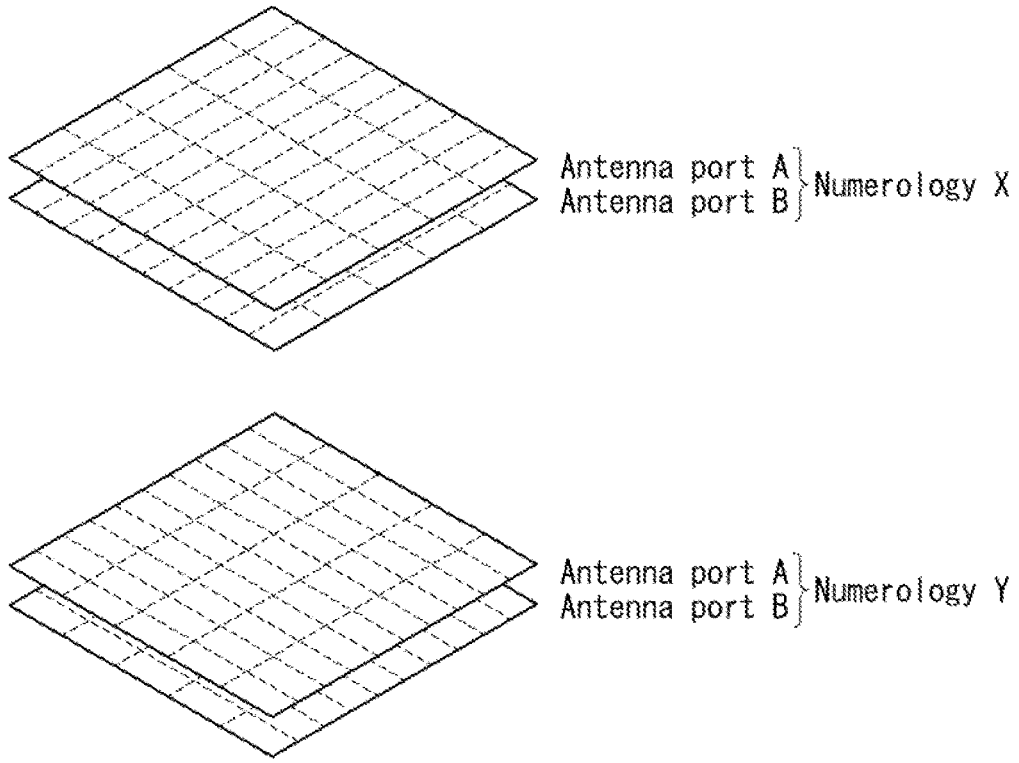
[FIG. 6]
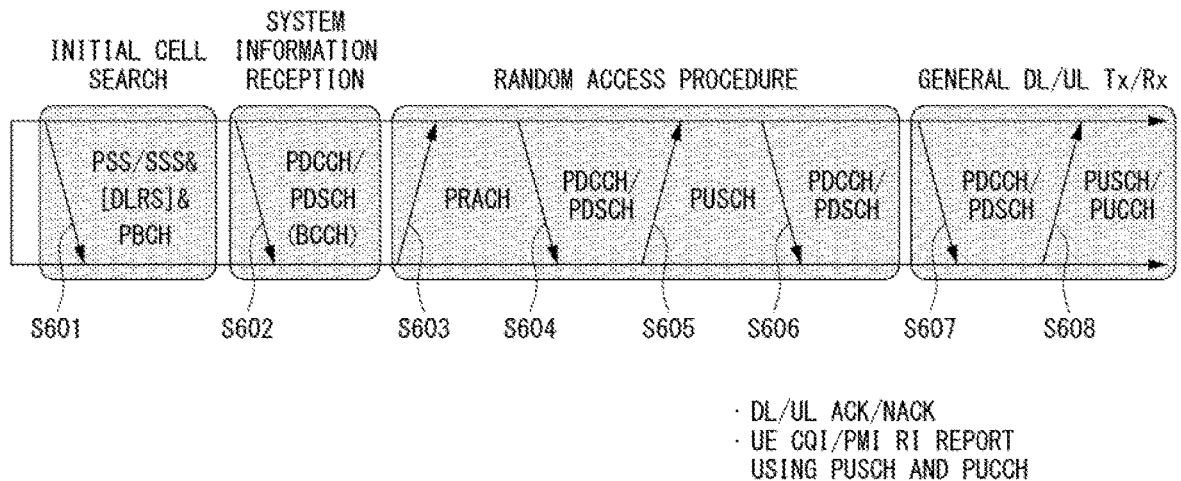

[FIG. 7]
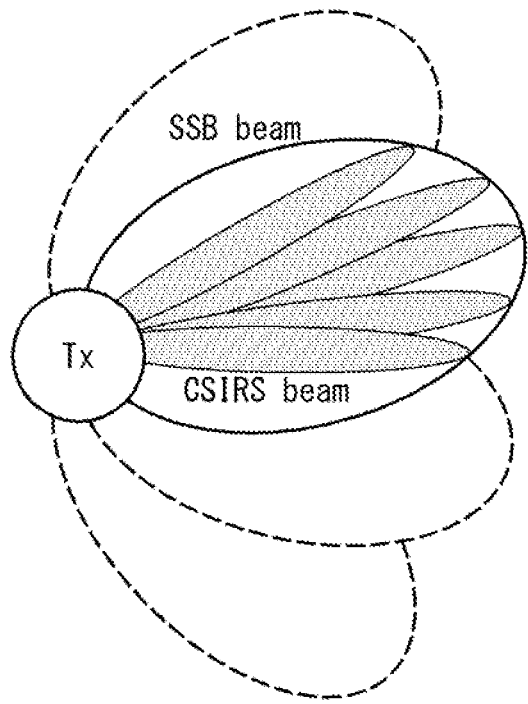
[FIG. 8]
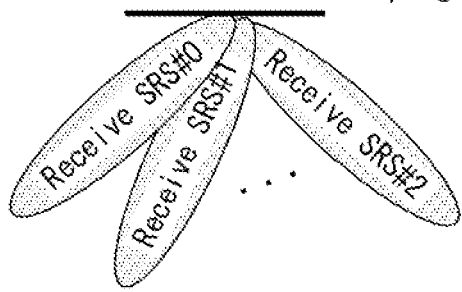
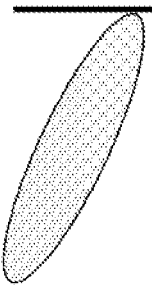
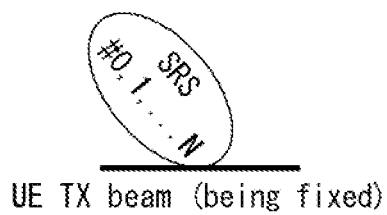
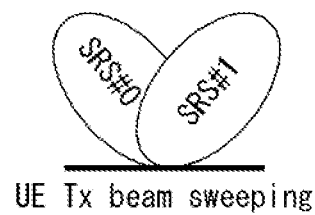
(a)  (b)

[FIG. 9]
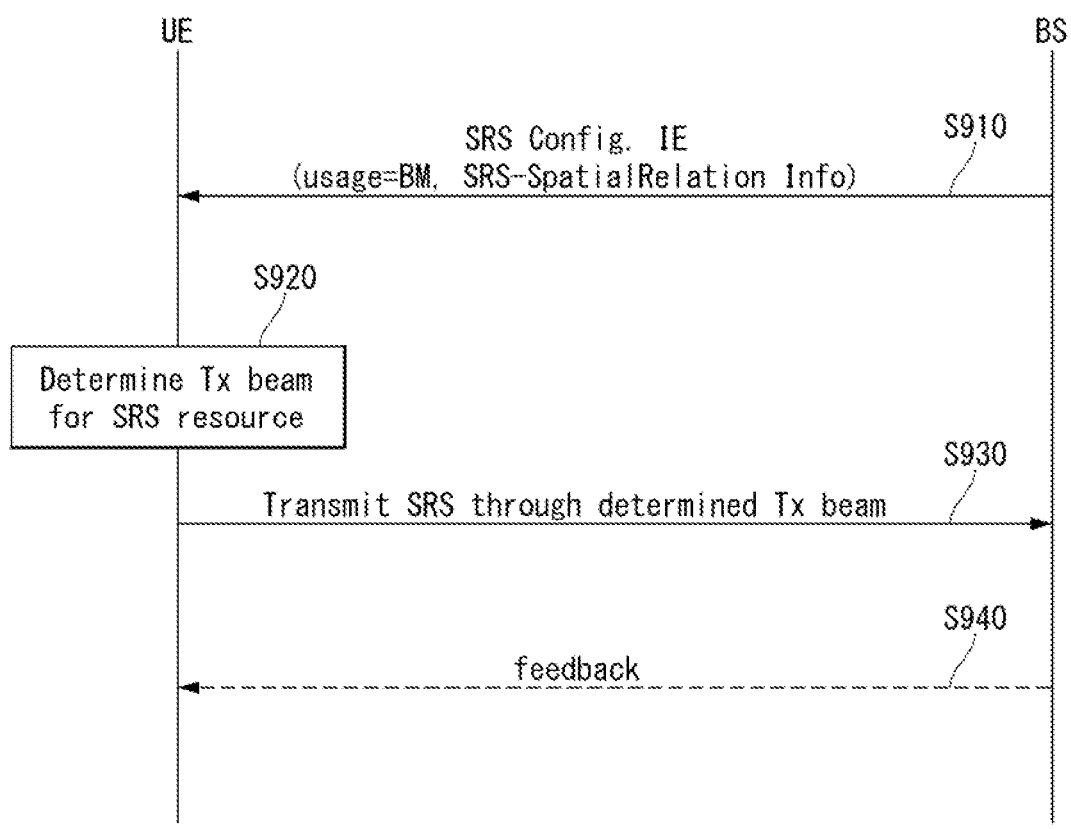

[FIG. 10]
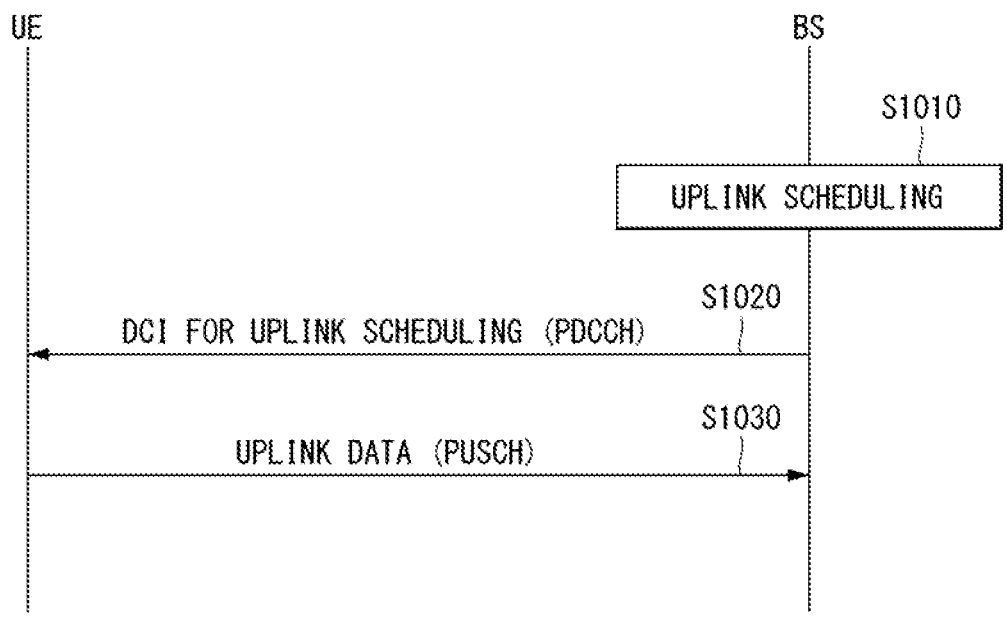

[FIG. 11]
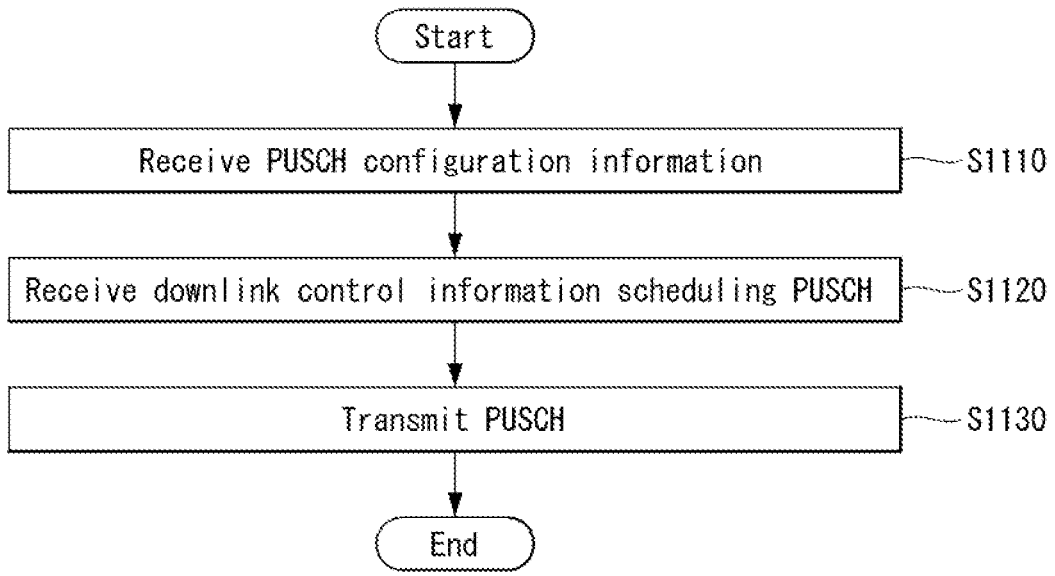
[FIG. 12]
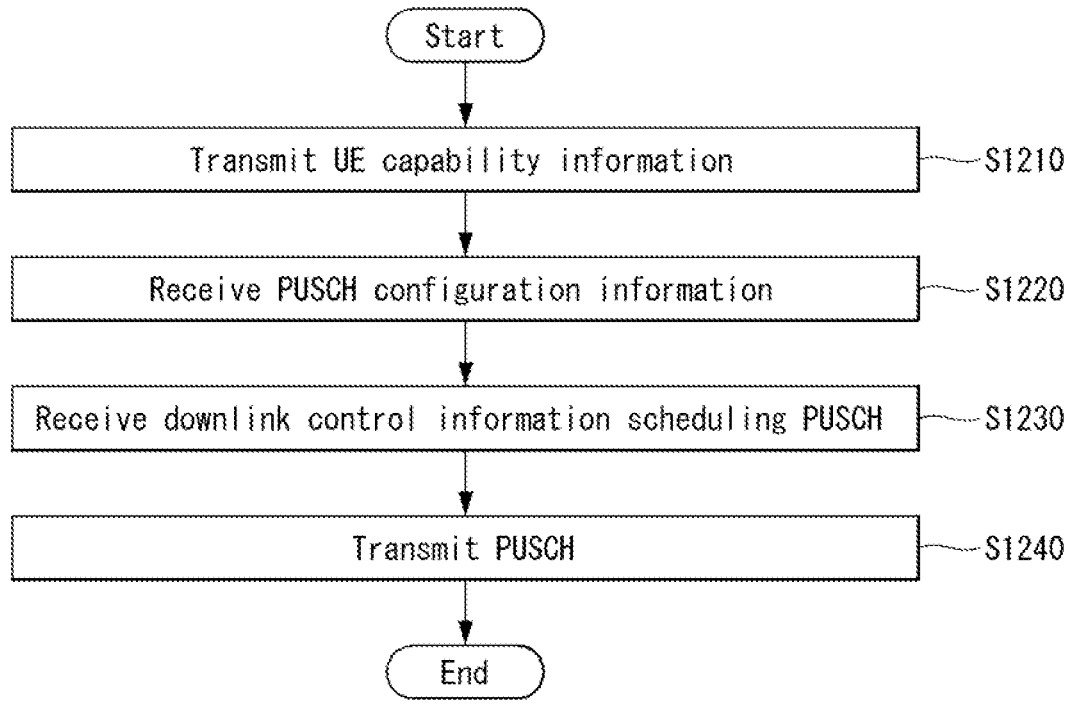

[FIG. 13]
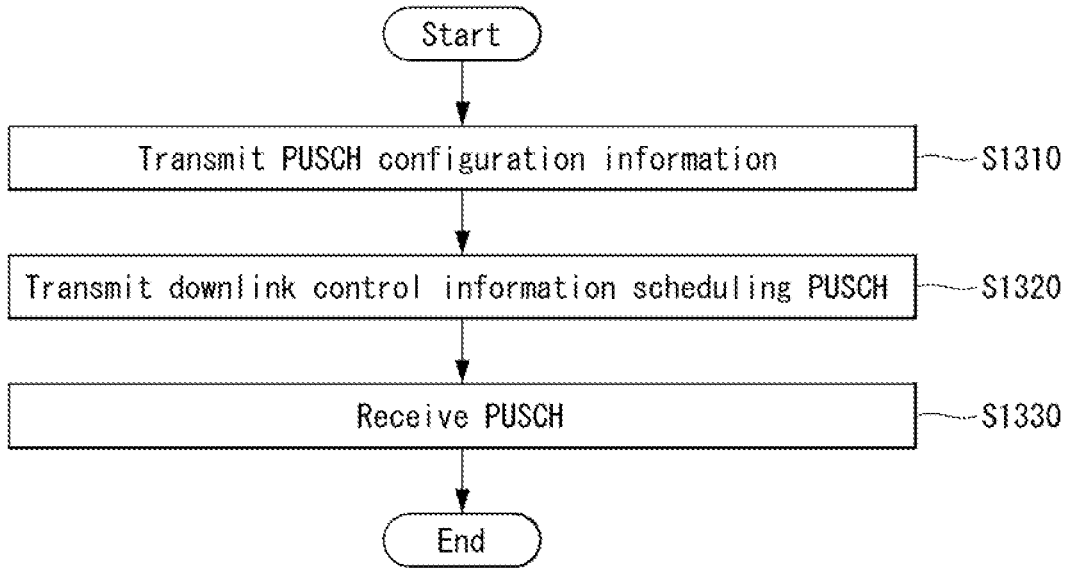
[FIG. 14]
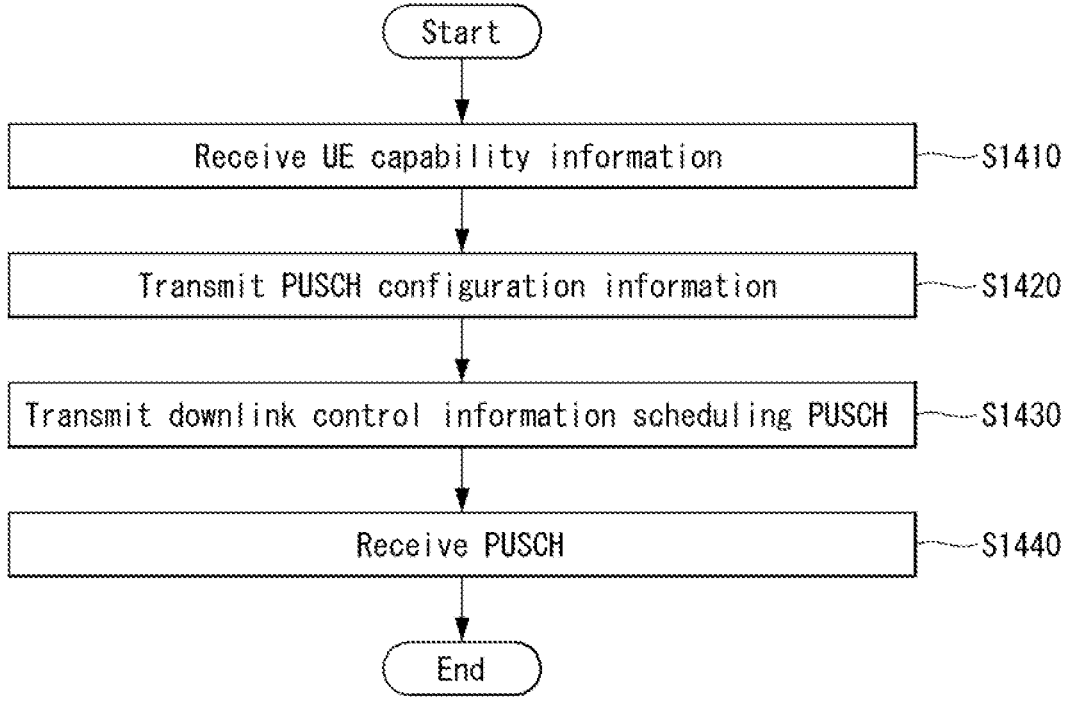

[FIG. 15]
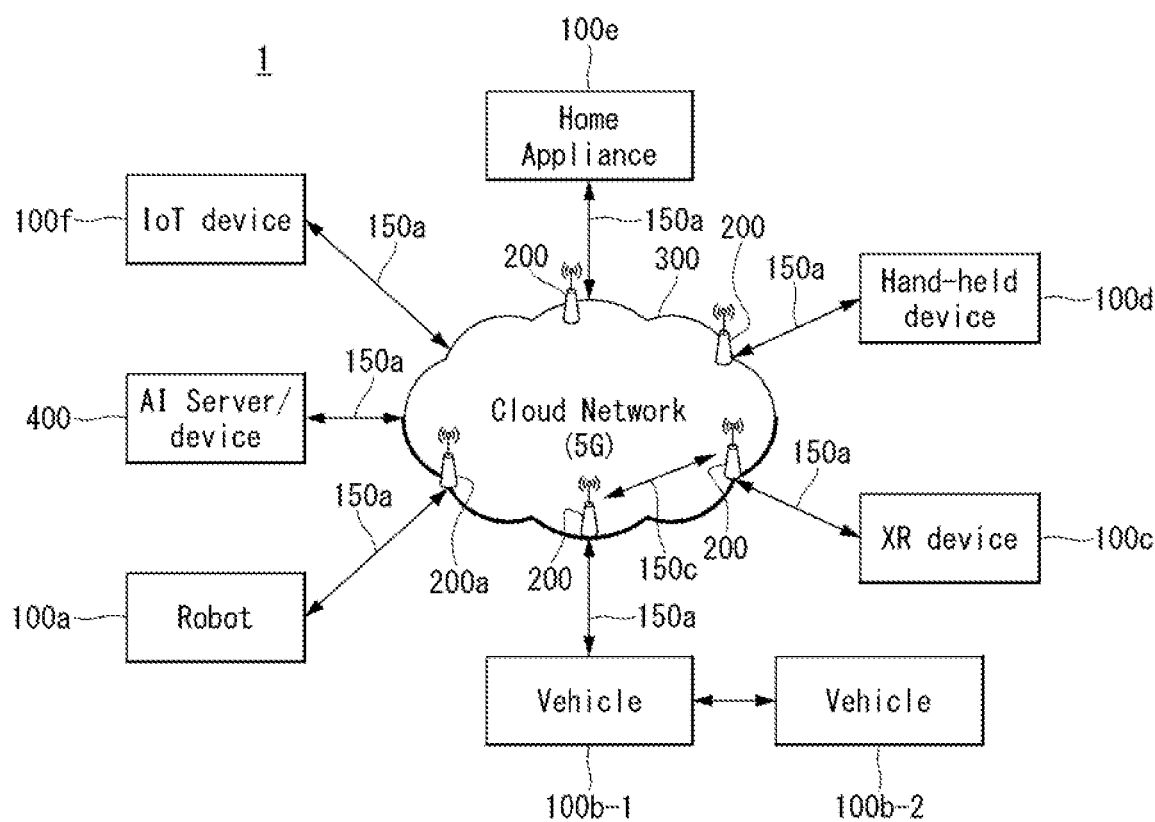

[FIG. 16]
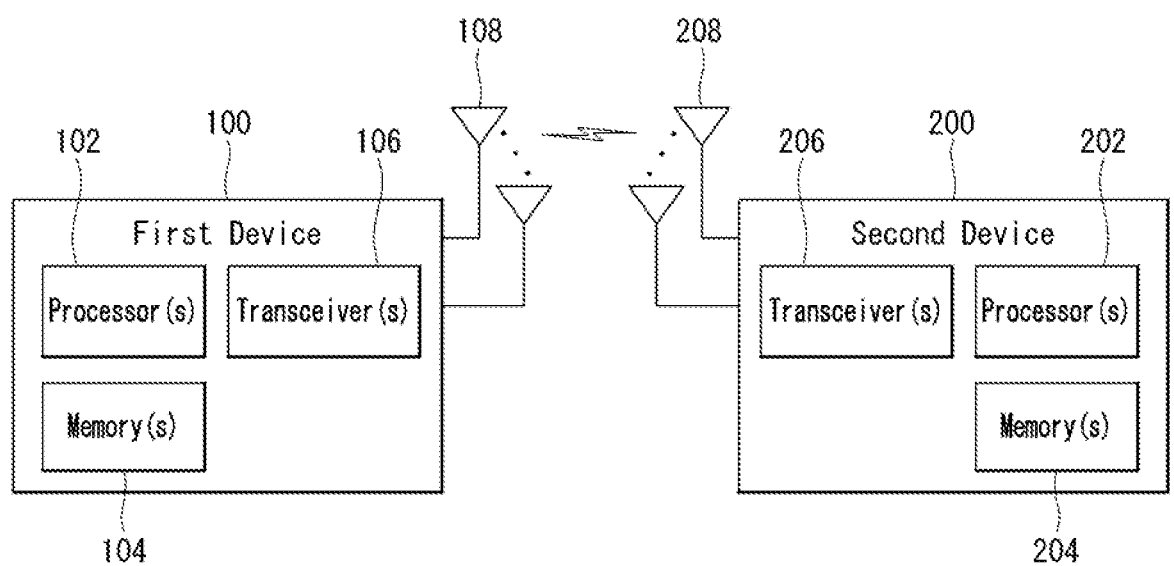

[FIG. 17]
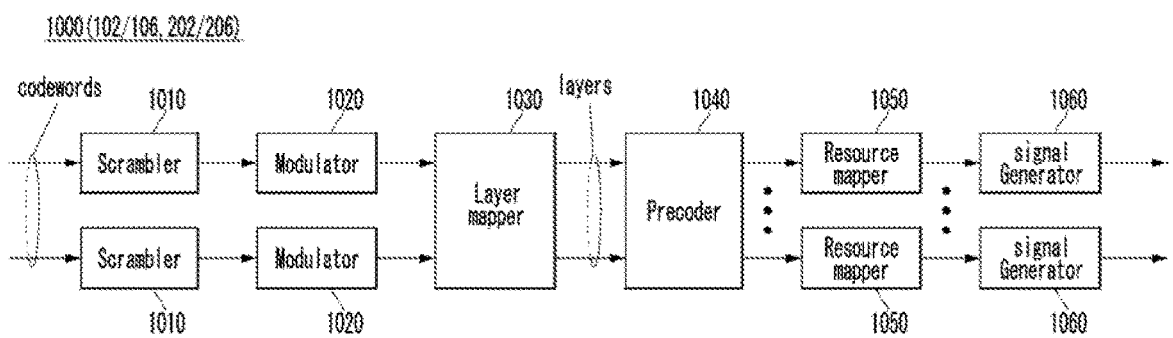

[FIG. 18]
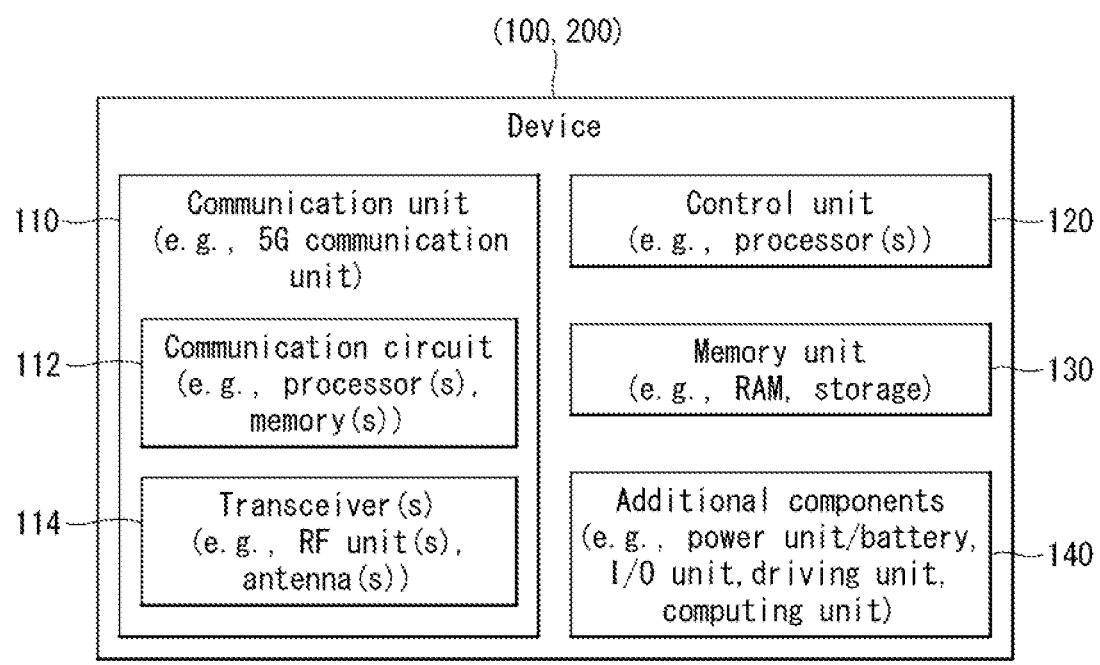

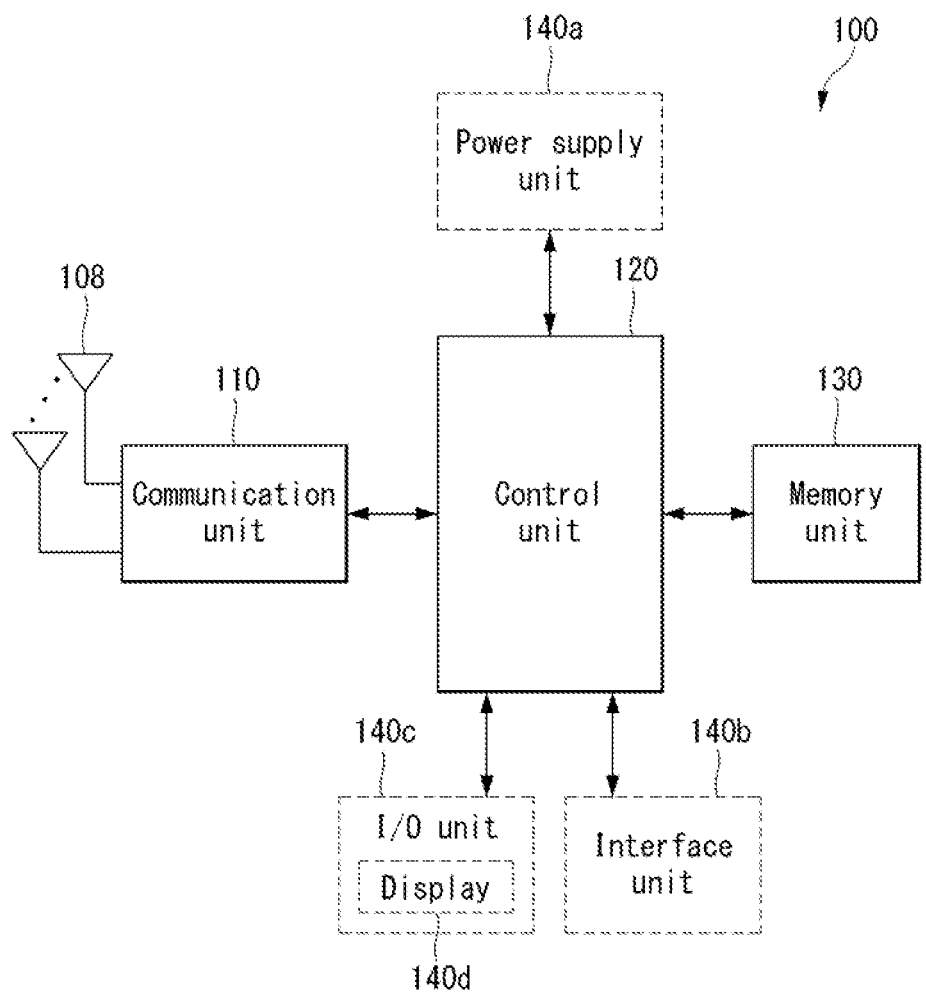
[FIG. 19]

METHOD FOR PERFORMING UPLINK TRANSMISSION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2020/000377, filed on Jan. 9, 2020, which claims the benefit of U.S. Provisional Patent Application No. 62/791,021, filed on Jan. 10, 2019, the contents of which are all incorporated by reference herein in their entirety.

TECHNICAL FIELD

The present disclosure relates to a method for transmitting and receiving a physical uplink shared channel in a wireless communication system and an apparatus therefor.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method for transmitting a physical uplink shared channel (PUSCH) by using beam correspondence.

Further, the present disclosure proposes a method for removing ambiguity of a UE or base station operation in terms of port virtualization when using the beam correspondence in relation to an indication of a beam for transmission of the PUSCH.

The technical objects of the present disclosure are not limited to the aforementioned technical objects, and other technical objects, which are not mentioned above, will be apparently appreciated by a person having ordinary skill in the art from the following description.

Technical Solution

According to an embodiment of the present disclosure, a method for transmitting, by a user equipment (UE), a Physical Uplink Shared Channel (PUSCH) in a wireless communication system includes: receiving configuration information related to transmission of the PUSCH; receiving downlink control information scheduling the PUSCH, the downlink control information including information representing a downlink reference signal (DL RS) related to a beam for transmission of the PUSCH; and transmitting the PUSCH by using the beam.

The transmission of the PUSCH is based on port virtualization applied to most recent sounding reference signal (SRS) transmission in a specific resource, and the specific resource is an SRS resource in which the DL RS is configured as spatial related information.

The information representing the DL RS may be a CSI-RS resource indicator (CRI) or an SS block resource indicator (SSBRI).

The most recent SRS transmission may be performed within preconfigured time duration having a current time as an end point.

The SRS resource may belong to an SRS resource set in which a higher layer parameter usage is configured as beam management.

When there is a plurality of SRS resources, the port virtualization may be applied based on the SRS transmission in an SRS resource having an index according to a specific criterion among the plurality of SRS resources.

The method may further include transmitting UE capability information related to an antenna port number Q of the UE.

The configuration information may include a port number P of the specific resource, and the port number P of the specific resource may be equal to or smaller than the antenna port number Q of the UE.

Based on the port number P of the specific resource smaller than the antenna port number Q of the UE, the port virtualization related to the transmission of the PUSCH may be performed based on an operation of multiplying a Q×P matrix related to generation of P ports from Q ports by a P×L precoding matrix.

The Q×P matrix may be the same as a Q×P matrix according to the port virtualization applied to the SRS transmission in the SRS resource.

The P×L precoding matrix may be based on the scheduling information, and the downlink control information may include at least one of a transmit precoding matrix indicator (TPMI) or a transmit rank indicator (TRI).

According to an embodiment, the beam may be a beam corresponding to a beam receiving the DL RS.

According to another embodiment of the present disclosure, a UE for transmitting a Physical Uplink Shared Channel (PUSCH) in a wireless communication system includes: one or more transceivers; one or more processors; and one or more memories operably connected to the one or more processors, and storing instructions of performing operations when the transmission of the PUSCH is executed by the one or more processors.

The operations include receiving configuration information related to transmission of the PUSCH, receiving downlink control information scheduling the PUSCH, the downlink control information including information representing a downlink reference signal (DL RS) related to a beam for transmission of the PUSCH; and transmitting the PUSCH by using the beam.

The transmission of the PUSCH is based on port virtualization applied to most recent sounding reference signal (SRS) transmission in a specific resource, and the specific resource is an SRS resource in which the DL RS is configured as spatial related information.

The information representing the DL RS may be a CSI-RS resource indicator (CRI) or an SS block resource indicator (SSBRI).

The operations may further include transmitting UE capability information related to the number Q of antenna ports of the UE.

The configuration information may include a port number P of the specific resource, and the port number P of the specific resource may be equal to or smaller than the antenna port number Q of the UE.

Based on the port number P of the specific resource smaller than the antenna port number Q of the UE, the port virtualization related to the transmission of the PUSCH may be performed based on an operation of multiplying a Q×P matrix related to generation of P ports from Q ports by a P×L precoding matrix.

The beam may be a beam corresponding to a beam receiving the DL RS.

According to yet another embodiment of the present disclosure, a method for receiving, by a base station, a Physical Uplink Shared Channel (PUSCH) in a wireless communication system includes: transmitting configuration information related to transmission of the PUSCH; transmitting downlink control information scheduling the PUSCH, the downlink control information including information representing a downlink reference signal (DL RS) related to a beam for transmission of the PUSCH; and receiving the PUSCH transmitted by using the beam.

The transmission of the PUSCH is based on port virtualization applied to most recent sounding reference signal (SRS) transmission in a specific resource, and the specific resource is an SRS resource in which the DL RS is configured as spatial related information.

According to still yet another embodiment of the present disclosure, a base station for receiving a Physical Uplink Shared Channel (PUSCH) in a wireless communication system includes: one or more transceivers; one or more processors; and one or more memories operably connectable to the one or more processors, and storing instructions of performing operations when executed by the one or more processors.

The operations include transmitting configuration information related to transmission of the PUSCH, transmitting downlink control information scheduling the PUSCH, the downlink control information including information representing a downlink reference signal (DL RS) related to a beam for transmission of the PUSCH, and receiving the PUSCH transmitted by using the beam.

The transmission of the PUSCH is based on port virtualization applied to most recent sounding reference signal (SRS) transmission in a specific resource, and the specific resource is an SRS resource in which the DL RS is configured as spatial related information.

According to still yet another embodiment of the present disclosure, an apparatus includes: one or more memories; and one or more processors functionally connected to the one or more memories.

The one or more processors are configured to control the apparatus to receive configuration information related to transmission of a physical uplink shared channel (PUSCH), receive downlink control information scheduling the PUSCH, the downlink control information including information representing a downlink reference signal (DL RS) related to a beam for transmission of the PUSCH, and transmit the PUSCH by using the beam.

The transmission of the PUSCH is based on port virtualization applied to most recent sounding reference signal (SRS) transmission in a specific resource, and the specific resource is an SRS resource in which the DL RS is configured as spatial related information.

According to still yet another embodiment of the present disclosure, one or more non-transitory computer-readable media store one or more instructions. The one or more instructions executable by one or more processors is configured to control a UE to receive configuration information related to transmission of a physical uplink shared channel (PUSCH), receive downlink control information scheduling the PUSCH, the downlink control information including information representing a downlink reference signal (DL RS) related to a beam for transmission of the PUSCH, and transmit the PUSCH by using the beam.

The transmission of the PUSCH is based on port virtualization applied to most recent sounding reference signal (SRS) transmission in a specific resource, and the specific resource is an SRS resource in which the DL RS is configured as spatial related information.

Advantageous Effects

According to an embodiment of the present disclosure, scheduling information of a PUSCH includes information representing a downlink reference signal (DL RS) related to a beam for transmission of the PUSCH. The PUSCH is transmitted by using the beam, and as a result, beam correspondence can be used in PUSCH transmission.

Further, according to an embodiment of the present disclosure, a UE transmits the PUSCH based on port virtualization applied to most recent SRS transmission in a specific resource. The specific resource is an SRS resource in which the DL RS is configured as spatial related information. Accordingly, when an uplink beam is indicated through the DL RS, a mismatch of a modulation coding scheme (MCS)/precoder can be prevented.

Further, according to an embodiment of the present disclosure, the UE transmits UE capability information related to an antenna port number Q. When a port number P of the specific resource is smaller than the antenna port number Q, the port virtualization is performed based on an operation process called an inter-specific matrix multiplication. Therefore, in performing the PUSCH transmission, an operation of a part corresponding to a UE implementation region is explicitly defined/configured to remove ambiguity of a UE operation.

Further, according to an embodiment of the present disclosure, the SRS resource belongs to an SRS resource set in which a higher layer parameter usage is set to beam management. In the case of a legacy scheme, an SRS resource set in which the higher layer parameter usage is set to codebook in order to indicate the beam related to the PUSCH transmission, and as a result, an SRS should be transmitted. According to the embodiment, the SRS for beam management is used, and as a result, the above-described processes may be skipped. Accordingly, there is an effect of latency and overhead reduction.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 is a flowchart showing an example of an uplink transmission/reception operation to which a method proposed in the present disclosure may be applied.

FIG. 11 is a flowchart for describing a method for transmitting, by a UE, a physical uplink shared channel according to an embodiment of the present disclosure.

FIG. 12 is a flowchart for describing a method for transmitting, by a UE, a physical uplink shared channel according to another embodiment of the present disclosure.

FIG. 13 is a flowchart for describing a method for receiving, by a base station, a physical uplink shared channel according to an embodiment of the present disclosure.

FIG. 14 is a flowchart for describing a method for receiving, by a base station, a physical uplink shared channel according to another embodiment of the present disclosure.

FIG. 15 illustrates a communication system 1 applied to the present disclosure.

FIG. 16 illustrates wireless devices applicable to the present disclosure.

FIG. 17 illustrates a signal process circuit for a transmission signal.

FIG. 18 illustrates another example of a wireless device applied to the present disclosure.

FIG. 19 illustrates a hand-held device applied to the present disclosure.

MODE FOR DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
- 36.211: Physical channels and modulation
- 36.212: Multiplexing and channel coding
- 36.213: Physical layer procedures
- 36.300: Overall description
- 36.331: Radio Resource Control (RRC)

3GPP NR
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane.

Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, µ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| µ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^\mu \in \{0, \ldots, N_{subframe}^{slots, \mu}-1\}$ in the subframe in the subframe and in ascending order of $n_{s,f}^\mu \in \{0, \ldots, N_{frame}^{slots, \mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe, \mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max, \mu}$. $N_{RB}^{max, \mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, ..., $N_{RB}^\mu N_{sc}^{RB}-1$ is an index on a frequency domain, and l̄=0, ..., $2^\mu N_{symb}^{(\mu)}-1$ refers to a location of a symbol in a subframe. The index pair (k, l̄) is used to refer to a resource element in a slot, where l=0, ..., $N_{symb}^\mu-1$.

The resource element (k, l̄) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=            SEQUENCE {
   tci-StateId              TCI-StateId,
   qcl-Type1                QCL-Info,
   qcl-Type2                QCL-Info
   ...
}
QCL-Info ::=             SEQUENCE {
   cell                     ServCellIndex
   bwp-Id                   BWP-Id
   referenceSignal          CHOICE {
      csi-rs                   NZP-CSI-RS-ResourceId,
      ssb                      SSB-Index
   },
   qcl-Type                 ENUMERATED {typeA, typeB, typeC,
   ...                      typeD},
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                                SEQUENCE {
    srs-ResourceSetToReleaseList                  SEQUENCE (SIZE(1..maxNrofSRS-
ResourceSets) ) OF SRS-ResourceSetId              OPTIONAL, -- Need N
    srs-ResourceSetToAddModList                   SEQUENCE (SIZE (1..maxNrofSRS-
ResourceSets) ) OF SRS-ResourceSet                OPTIONAL, -- Need N
    srs-ResourceSetToReleaseList                  SEQUENCE (SIZE (1..maxNrofSRS-
Resources) ) OF SRS-ResourceId                    OPTIONAL, -- Need N
    srs-ResourceToAddModList                      SEQUENCE (SIZE (1..maxNrofSRS-
Resources) ) OF SRS-Resource                      OPTIONAL, -- Need N
    tpc-Accumulation                              ENUMERATED (disabled)
    ...
}
SRS-ResourceSet ::=                           SEQUENCE {
    srs-ResourceSetId                             SRS-ResouceSetId,
    srs-ResourceIdList                            SEQUENCE (SIZE (1..maxNrofSRS-
ResourcesPerSet) ) OF SRS-ResourceId              OPTIONAL, -- Cond Setup
    resourceType                                  CHOICE {
        aperiodic                                     SEQUENCE {
            aperiodicSRS-ResourceTrigger                  INTEGER (1..maxNrofSRS-
TriggerStates-1},
            csi-RS                                        NZP-CSI-RS-ResourceId
            slotOffset                                    INTEGER (1..32)
            ...
        },
        semi-persistent                               SEQUENCE {
            associatedCSI-RS                              NZP-CSI-RS-ResourceId
            ...
        },
        periodic                                      SEQUENCE {
            associatedCSI-RS                              NZP-CSI-RS-ResourceId
            ...
        }
    },
    usage                                         ENUMERATED (beamManagement,
codebook, nonCodebook, antennaSwitching),
    alpha                                         Alpha
    p0                                            INTEGER (-202..24)
    pathlossReferenceRS                           CHOICE {
        ssb-Index                                     SSB-Index,
        csi-RS-Index                                  NZP-CSI-RS-ResourceId
    SES-SpatialRelationInfo ::=                   SEQUENCE {
        servingCellId                                 ServCellIndex
        referenceSignal                               CHOICE {
            ssb-Index                                     SSB-Index,
            csi-RS-Index                                  NZP-CSI-RS-ResourceId,
            srs                                           SEQUENCE {
                resourceId                                    SRS-ResourceId,
                uplinkBWP                                     BMP-Id
            }
        }
    }
}
SRS-ResourceId ::=                            INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-Spatial Relation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfig-Type' set to 'periodic':
  i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or
  ii) if SRS-SpatialRelationInfo is set to 'CSI-RS,' the UE transmits the SRS resource with the same spatial domain transmission filter used for the reception of the periodic CSI-RS or SP CSI-RS; or
  iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.
  i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.
  ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.
  iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

FIG. 10 is a flowchart showing an example of an uplink transmission/reception operation to which a method proposed in the present disclosure may be applied.

Referring to FIG. 10, the eNB schedules uplink transmission such as the frequency/time resource, the transport layer, an uplink precoder, the MCS, etc., (S1010). In particular, the eNB may determine a beam for PUSCH transmission of the UE through the aforementioned operations.

The UE receives DCI for downlink scheduling (i.e., including scheduling information of the PUSCH) on the PDCCH (S1020).

DCI format 0_0 or 0_1 may be used for the uplink scheduling and in particular, DCI format 0_1 includes the following information.

Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

The UE transmits the uplink data to the eNB on the PUSCH (S1030).

When the UE detects a PDCCH including DCI format 0_0 or 0_1, the UE transmits the corresponding PUSCH according to the indication by the corresponding DCI.

Two transmission schemes, i.e., codebook based transmission and non-codebook based transmission are supported for PUSCH transmission:
  i) When higher layer parameter txConfig' is set to 'codebook', the UE is configured to the codebook based transmission. On the contrary, when higher layer parameter txConfig' is set to 'nonCodebook', the UE is configured to the non-codebook based transmission. When higher layer parameter 'txConfig' is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'.

When higher layer parameter 'txConfig' set to 'codebook' is configured for the UE, at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'nonCodebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

The contents described above may be applied in combination with methods proposed in the present disclosure to be described below or may be supplemented to clarify technical features of the methods proposed in the present disclosure.

In the NR standard, (in particular, in frequency range (FR) 2), an operation for determining an uplink (UL) transmission beam by the UE is supported.

Typically, by configuring spatialRelationInfo which is an RRC parameter in determining a specific UL transmission beam, selective association information is configured among CSI-RS resource ID, SSB ID, or SRS resource ID as a value of the corresponding parameter to determine the uplink transmission beam with the corresponding relation information. In particular, two parameter types described above may correspond to a case where UE beam correspondence is established, and a last SRS resource ID type may be defined to be configurable in a case where the UE beam correspondence is not fully supported.

However, the base station may explicitly perform uplink beam/transmission indication/control of the UE in a specific antenna group (e.g., a panel type) unit which is actually implemented in the UE. In which antenna group unit the UE receives a DL RS (one of CSI-RS resource ID or SSB ID) corresponding to the spatialRelationInfo value or performs transmission corresponding to the SRS resource ID from the first is an implementation region of the UE. Accordingly, the base station may not know the implementation region of the UE and perform a control (e.g., UL interference control, etc.) of even the corresponding region.

Meanwhile, in a codebook-based UL (CB-UL) scheme, an SRS resource set is configured in which a usage parameter is set to 'codebook'. Two (or more) SRS resources may be configured in the SRS resource set. In downlink control information format 0_1 (DCI format 0_1), an SRSI field dynamically indicates which SRS resource of the two SRS resources is to be applied as beam and port virtualization for PUSCH transmission. The UE generates a final PUSCH precoder by using a transmit precoding matrix indicator (TPMI) and a transmit rank indicator (TRI) indicated together in downlink control information (DCI) in such an indicated SRS resource, and applies the generated final PUSCH precoder to the PUSCH transmission.

Such a scheme has a disadvantage, in terms of overhead, in that the SRS resource/set is separately configured in which the higher layer parameter usage is continuously set to 'codebook', and an SRS resource(s) which belongs thereto should be particularly transmitted in advance. If such SRS transmission is skipped and PUSCH scheduling may be performed, overhead/latency may be improved.

Hereinafter, matters related to an indication of a UL beam by the downlink control information (DCI) and/or the UL grant will be described.

Two uplink transmission schemes may be supported. One is codebook-based UL CB-UL) and the other one is non-codebook-based UL (NCB-UL). The UE may be configured with a dedicated SRS resource set for the CB-UL or NCB-UL according to 'txConfig' which is an RRC parameter set to 'codebook' or nonCodebook'.

In particular, in the case of the CB-UL, when the UE is configured with an SRS resource set in which two SRS resources are configured within a set, an 1-bit SRI field exists as DCI format 0_1 to dynamically select one resource SRS resources (of the two SRS resources). The selected SRS resource is used as antenna port virtualization for PUSCH beam selection and scheduled PUSCH transmission.

The corresponding function is a required function of the NR for performing UL scheduling determination including UL MCS determination by gNB by supporting appropriate UL link adaptation based on measurement of SRS transmission. Accordingly, it is unclear whether a new additional mechanism of directly representing CSRI/SSBRI on the UL grant may be introduced in order to schedule a corresponding PUSCH without a clear evidence or indication for a method for predetermining appropriate UL MCS by the gNB.

In this regard, according to the same mechanism supported in the legacy scheme, legacy fields such as 'SRS resource indicator' and 'precoding information and the number of layers' should be able to be at least configured. Whether the downlink control information (DCI) may support to directly represent the PUSCH beam by the CRI/SSBRI may be considered as an additional configuration option.

Specifically, an additional examination for detailed matters related to whether to apply such a mechanism without SRS configuration/transmission for the UL link adaptation is required.

When such a mechanism is applicable, whether determination of 'the precoding information and the number of layers', and a UL modulation coding scheme (MCS) may be accurately performed as compared with the legacy scheme should be examined together with an advantage and a disadvantage thereof.

When the mechanism is not applicable, a detailed mechanism should be discussed, which includes a required SRS resource/set configuration and a mutual relation with the representation by the CRI/SSBRI in terms of the port virtualization in addition to exact dimension of a PUSCH port and a PUSCH DMRS port.

As compared with the legacy codebook-based uplink operation, it is unclear that a new scheme of directly presenting the CRI/SSBRI on the uplink grant is introduced and applied.

Specifically, the legacy codebook-based uplink operation is indicated by the SRI for supporting the UL link adaptation based on the measurement of the SRS in order to predetermine the UL MCS for scheduling. When the above-described legacy scheme is considered, the scheme of directly representing the CRI/SSBRI on the uplink grant is unclear in terms of the MCS determination, the mutual relation with the SRS, and the accurate PUSCH/DMRS port virtualization.

In order to solve a problem due to the above-described matters, at least one of the following methods may be considered in the present disclosure. That is, methods to be described below are just distinguished for convenience and it is needless to say that some components of any one method may be substituted with some components of another method or may be applied in combination with each other.

A specific DL RS may be indicated through specific uplink grant/downlink control information (UL grant/DCI) for an uplink beam indication purpose, etc. (e.g., channel state information reference signal resource indicator (CRI) or SS block resource indicator (SSBRI)). The UE may transmit the PUSCH with a transmission beam corresponding to a reception beam (e.g., spatial domain Rx filter) applied when receiving the corresponding DL RS. The operation may be limited only to 1-layer PUSCH scheduling.

When the UE has one or more Tx chains/antennas(group)/ports, the following method may be considered. The UE applies specific port virtualization (Q-by-1 matrix, where, Q may represent the number of Tx chains/antennas(group)/ports) in order to generate the 1-layer PUSCH port. In this case, "Q-by-1" port virtualization is not configured as a region of UE implementation, but the corresponding UE may be configured/indicated to apply at least one option of option 1 and option 2 below.

[Option 1]

A method for applying a specific PUCCH (UL) resource according to port virtualization applied to most recent 1-layer (PUCCH DMRS) transmission may be considered.

Specifically, the specific PUCCH (UL) resource is a resource which is configured/indicated with a DL RS which is the same as the DL RS indicated by the uplink grant as spatial relation information. The UE may apply the port virtualization to such a specific PUCCH (UL) resource according to the port virtualization applied to the most recent 1-layer (PUCCH DMRS) transmission.

The base station may make an uplink scheduling (i.e., PUSCH scheduling) determination based on a result of receiving precedent UL transmission (e.g., PUCCH). Accordingly, when the UE transmits the PUSCH according to the specific uplink grant/downlink control information (UL grant/DCI), a mismatch of the modulation coding scheme (MCS)/precoder may be prevented.

When there are multiple specific PUCCH resources which are configured/indicated with the DL RS which is the same as the indicated DL RS as the spatial relation information, the following method may be considered.

According to an embodiment, the UE may be defined/configured to apply the port virtualization according to a most recently transmitted resource among a plurality of PUCCH resources.

According to an embodiment, the UE may be defined/configured to apply the port virtualization according to a PUCCH resource having an index depending on a specific criterion among the plurality of specific PUCCH resources. An example of the specific criterion may include a lowest/highest index.

According to an embodiment, the UE may be configured to operate by combining two embodiments described above. As an example, the UE applies the port virtualization according to the most recently transmitted resource, but if the number of most recently transmitted resources is 2 or more, the UE may be defined/configured to apply the port virtualization according to a resource having an index which becomes the specific criterion among the two or more resources.

The following operation may be additionally defined in relation to the transmission of the PUCCH resource so as to apply the above operation.

That is, before the PUSCH scheduling, the transmission of the PUCCH resource may be scheduled at least once or more. As a result, the UE is expected to be scheduled to transmit such PUCCH resource at least once before the PUSCH scheduling.

In this case, a condition related to the at least once may be configured so as to avoid application of a situation in which excessively a lot of time elapsed (an out-dated situation). Specifically, in relation to the at least one, a specific time duration may be defined/configured.

Specifically, a more past time than the specific time duration from a current specific timing may be configured to be excluded from application. For example, the transmission of the PUCCH resource may be performed in a specific time duration having a current timing as an end point. When the transmission of the PUCCH resource is performed in a duration which deviates the specific time duration, the transmission of the PUCCH resource may be excluded from the application of the port virtualization. That is, when the UE applies the port virtualization depending on the transmission of the specific PUCCH resource, the transmission of the PUCCH resource performed earlier than a specific time duration from the current timing may be excluded.

[Option 2]

A method for applying port virtualization applied to a most recently transmitted specific SRS resource may be considered.

Specifically, the specific SRS resource as a resource in which the DL RS which is the same as the DL RS indicated by the uplink grant is configured (indicated) as the spatial relation information is a resource which belongs to the SRS resource set in which the higher layer parameter usage is set to 'beam management'. The UE may apply the port virtualization applied to most recent transmission to the specific SRS resource.

The base station may make an uplink scheduling (i.e., PUSCH scheduling) determination based on a result of receiving precedent UL transmission (e.g., SRS). Accordingly, when the UE transmits the PUSCH according to the specific UL grant/DCI, a mismatch of the modulation coding scheme (MCS)/precoder may be prevented.

Further, Beam-Management SRS (BM-SRS, usage: beam management) is used for the scheduling of the PUSCH, so the configuration of the SRS in which the usage is 'codebook' and the resulting transmission of the SRS need not be performed. Therefore, there is an effect of latency/overhead reduction as compared with the legacy scheme.

When there are multiple specific SRS resources which are configured/indicated with the DL RS which is the same as the indicated DL RS as the spatial relation information, the following method may be considered.

According to an embodiment, the UE may be defined/configured to apply the port virtualization according to a most recently transmitted resource among a plurality of SRS resources.

According to an embodiment, the UE may be defined/configured to apply the port virtualization according to an SRS resource having an index depending on a specific criterion among the plurality of specific SRS resources. An example of the specific criterion may include a lowest/highest index.

According to an embodiment, the UE may be configured to operate by combining two embodiments described above. As an example, the UE applies the port virtualization according to the most recently transmitted resource, but if the number of most recently transmitted resources is 2 or more, the UE may be defined/configured to apply the port virtualization according to a resource having an index which becomes the specific criterion among the two or more resources.

The following operation may be additionally defined in relation to transmission of the SRS resource so as to apply the above operation.

That is, before the PUSCH scheduling, the transmission of the SRS resource may be scheduled at least once or more. As a result, the UE is expected to be scheduled to transmit such SRS resource at least once before the PUSCH scheduling.

In this case, a condition related to the at least once may be configured so as to avoid application of a situation in which excessively a lot of time elapsed (an out-dated situation). Specifically, in relation to the at least one, a specific time duration may be defined/configured.

Specifically, a more past time than the specific time duration from a current specific timing may be configured to be excluded from application. For example, the transmission of the SRS resource may be performed in a specific time duration having a current timing as an end point. When the transmission of the SRS resource is performed in a duration which deviates the specific time duration, the transmission of the SRS resource may be excluded from the application of the port virtualization. That is, when the UE applies the port virtualization depending on the transmission of the specific SRS resource, the transmission of the SRS resource performed earlier than a specific time duration from the current timing may be excluded.

The above-described operations may be applied to multi-layer PUSCH scheduling of 1 layer or more in addition to single layer (1-layer) PUSCH scheduling.

Specifically, when a specific DL RS (e.g., CRI or SSBRI) is indicated through specific uplink grant/downlink control information (UL grant/DCI) (for the uplink beam indication purpose, etc.), the UE may transmit the PUSCH with the transmission beam corresponding to the reception beam (e.g., spatial-domain Rx filter) applied when receiving the corresponding DL RS. Such an operation may be applied to multi-layer PUSCH scheduling in addition to single layer (1-layer) PUSCH scheduling.

When the PUSCH is scheduled in a single layer (1-layer), at least one of the above proposed operations may be applied.

For a case where the PUSCH is scheduled in multi layers (e.g., L-layers), Transmit precoding matrix indicator (TPMI) and transmit rank indicator (TRI) (indicating an L value) fields may coexist in the corresponding downlink control information (DCI) together. In this case, the TPMI may indicate a specific defined/configured precoder matrix index, and a dimension of the matrix is P-by-L.

As an example, the P value may be a port number configured within the (indicated) SRS resource.

As another example, the P value may be a value configured through a separate indicator or a parameter by a higher layer or a value indicated by the MAC and/or DCI. This is to perform PUSCH scheduling by a DL RS indication such as the CRI/SSBRI without directly related SRS transmission.

When the UE is implemented to have Q Tx chains/antennas(group)/ports, Q is configured as Q=P so as to prevent the ambiguity of the UE operation to be configured to be applied to the P-by-L matrix. UE capability reporting for the operation may be defined/configured. Specifically, the UE performs capability reporting regarding the (max) P value (and/or Q value). The base station may configure a value reported by the UE as it is or configure/indicate the operation to be smaller than the value reported by the UE.

And/or when the P value to be applied is smaller than the number Q of Tx chains/antennas(group)/ports which the UE has (or to be involved in the PUSCH transmission), specific port virtualization (a matrix of Q-by-P, here, Q may be the number of Tx chains/antennas(group)/ports) for generating P ports smaller than the Q ports may be applied. However, such a condition related to the port number is not required and may be continuously defined/configured as an integrated rule/behavior so as to apply the specific port virtualization.

In this case, "Q-by-P" port virtualization is not entrusted to a UE implementation freedom, but at least option of options 3 and 4 below may be configured/indicated to be applied.

[Option 3]

A method for applying a rank restriction as L=1 may be considered.

Specifically, an operation to be described in relation to the rank restriction may be configured/indicated to be applied to a case corresponding to at least one of i) to iii) below.

i) Case of limiting to case where rank restriction is continuously applied as L=1
ii) Case of rank restriction as L=1
iii) Case of being dynamically scheduled to L=1

Since L=1, the port virtualization applied to transmission of 1-layer (PUCCH DMRS) transmitted most recently may be applied to a specific PUCCH resource which are configured/indicated with the DL RS which is the same as the indicated DL RS as the spatial relation information.

The transmission depending on the specific PUCCH resource(s) is 1-layer, but the UE may be previously defined/configured/indicated so as to a final 1-layer precoder/virtualization through an operation process of multiplying the Q-by-P matrix by the P-by-1 matrix.

According to an embodiment, an operation of applying the port virtualization according to the transmission of the specific PUCCH resource to only any one of the Q-by-P matrix and the P-by-1 matrix and applying an indicated value to the remainder may be defined/configured/indicated. As an example, according to the corresponding PUSCH scheduling, the UE may inherit and apply the same port virtualization only to the Q-by-P matrix and apply, to the P-by-1 matrix, the TPMI field value indicated together in the corresponding downlink control information (DCI).

The embodiment may be applied even to a case of not limiting to L=1. Specifically, the following operation may be defined/configured/indicated to apply the TPMI/TRI value indicated together in the downlink control information (DCI) as it is.

i) The UE inherits and applies only the Q-by-P matrix (for port virtualization) applied when transmitting the specific PUCCH resource. ii) The UE may finally apply L-layer PUSCH precoder/virtualization through the operation process of multiplying the Q-by-P matrix (according to the TPMI indication) by the P-by-L matrix.

When there are multiple specific PUCCH resources which are configured/indicated with the same DL RS as the spatial relation information, the following method may be considered.

According to an embodiment, the UE may be defined/configured to apply the port virtualization according to a most recently transmitted resource among a plurality of PUCCH resources.

According to an embodiment, the UE may be defined/configured to apply the port virtualization according to a PUCCH resource having an index depending on a specific criterion among the plurality of specific PUCCH resources. An example of the specific criterion may include a lowest/highest index.

According to an embodiment, the UE may be configured to operate by combining two embodiments described above. As an example, the UE applies the port virtualization according to the most recently transmitted resource, but if the number of most recently transmitted resources is 2 or more, the UE may be defined/configured to apply the port virtualization according to a resource having an index which becomes the specific criterion among the two or more resources.

The following operation may be additionally defined in relation to the transmission of the PUCCH resource so as to apply the above operation.

That is, before the PUSCH scheduling, the transmission of the PUCCH resource may be scheduled at least once or more. As a result, the UE is expected to be scheduled to transmit such PUCCH resource at least once before the PUSCH scheduling.

In this case, a condition related to the at least once may be configured so as to avoid application of a situation in which excessively a lot of time elapsed (an out-dated situation). Specifically, in relation to the at least one, a specific time duration may be defined/configured.

Specifically, a more past time than the specific time duration from a current specific timing may be configured to be excluded from application. For example, the transmission of the PUCCH resource may be performed in a specific time duration having a current timing as an end point. When the transmission of the PUCCH resource is performed in a duration which deviates the specific time duration, the transmission of the PUCCH resource may be excluded from the application of the port virtualization. That is, when the UE applies the port virtualization depending on the transmission of the specific PUCCH resource, the transmission of the PUCCH resource performed earlier than a specific time duration from the current timing may be excluded.

[Option 4]

A method for applying port virtualization applied to a most recently transmitted specific P-port SRS resource may be considered.

Specifically, the specific P-port SRS resource as a resource in which the DL RS which is the same as the DL RS indicated by the uplink grant is configured/indicated as the spatial relation information is a resource which belongs to the SRS resource set in which the higher layer parameter usage is set to 'beam management'.

The UE may be defined/configured/indicated to operate as follows.
  i) The UE may apply most recently transmitted port virtualization (Q-by-P matrix) to the specific P-port SRS resource. ii) The UE may finally apply L-layer PUSCH precoder/virtualization through the operation process of multiplying the Q-by-P matrix (according to the TPMI indication) by the P-by-L matrix.

The Q-by-P matrix is used only by BM-SRS through the above operation, and in the uplink grant, only the specific DL RS and TPMI/TRI are dynamically additionally indicated to perform uplink scheduling.

Further, the BM-SRS is used for the scheduling of the PUSCH, so the configuration of the SRS in which the usage is 'codebook' and the resulting transmission of the SRS need not be performed. Therefore, there is an effect of latency/overhead reduction as compared with the legacy scheme.

When there are multiple specific SRS resources which are configured/indicated with the DL RS which is the same as the indicated DL RS as the spatial relation information, the following method may be considered.

According to an embodiment, the UE may be defined/configured to apply the port virtualization according to a most recently transmitted resource among a plurality of SRS resources.

According to an embodiment, the UE may be defined/configured to apply the port virtualization according to an SRS resource having an index depending on a specific criterion among the plurality of specific SRS resources. An example of the specific criterion may include a lowest/highest index.

According to an embodiment, the UE may be configured to operate by combining two embodiments described above. As an example, the UE applies the port virtualization according to the most recent transmitted resource, but if the number of most recent transmitted resources is 2 or more, the UE may be defined/configured to apply the port virtualization according to a resource having an index which becomes the specific criterion among the two or more resources.

The following operation may be additionally defined in relation to transmission of the SRS resource so as to apply the above operation.

That is, before the PUSCH scheduling, the transmission of the SRS resource may be scheduled at least once or more. As a result, the UE is expected to be scheduled to transmit such SRS resource at least once before the PUSCH scheduling.

In this case, a condition related to the at least once may be configured so as to avoid application of a situation in which excessively a lot of time elapsed (an out-dated situation). Specifically, in relation to the at least one, a specific time duration may be defined/configured.

Specifically, a more past time than the specific time duration from a current specific timing may be configured to be excluded from application. For example, the transmission of the SRS resource may be performed in a specific time duration having a current timing as an end point. When the transmission of the SRS resource is performed in a duration which deviates the specific time duration, the transmission of the SRS resource may be excluded from the application of the port virtualization. That is, when the UE applies the port virtualization depending on the transmission of the specific SRS resource, the transmission of the SRS resource performed earlier than a specific time duration from the current timing may be excluded.

In the proposed operations, a proposed specific PUSCH scheduling related indicator(s) (e.g., indication information through a specific field/state within corresponding related DCI) may be configured/indicated through a ("configured grant" related specific) higher layer parameter (e.g., RRC and/or MAC CE signaling) during grant-free PUSCH scheduling.

An example of the UE operation according to at least one of the above-described examples is as follows.
  1) Reporting, to the base station, UE capability including UE capability related information
  2) Receiving configuration/scheduling of a codebook-based uplink related operation including the DL RS for uplink beam information from the base station
  3) Transmitting, to the base station, codebook-based uplink ("CB-based UL") according to the configuration/scheduling An example of the base station operation according to at least one of the above-described examples is as follows.
  1) Receiving, from the base station, UE capability including the UE capability related information
  2) Configuring/scheduling, to the UE, the codebook-based uplink related operation including the DL RS for the uplink beam information
  3) Receiving, from the base station, codebook-based uplink/PUSCH ("CB-based UL/PUSCH") according to the configuring/scheduling Through the application of the proposed operation(s), when transmitting the "CB-based UL" related PUSCH, the base station directly indicates a specific DL RS in the uplink grant and skips SRS transmission and reception processes for uplink (UL) adaptation, thereby achieving the latency/overhead reduction effect.

In terms of implementation, the operations (e.g., operations related to PUSCH transmission and reception) of the base station/UE according to the above-described embodiments may be processed by apparatuses (e.g., processors 102 and 202 in FIG. 16) in FIGS. 15 to 19 to be described below.

Further, the operations (e.g., operations related to PUSCH transmission and reception) of the base station/UE according to the above-described embodiment may be stored in memories (e.g., one or more memories 104 and 204 in FIG. 16) in the form of a command/program (e.g., instruction or executable code) for driving at least one processor (e.g., 102 and 202 in FIG. 16).

The above-described embodiments will be described in detail with reference to FIGS. 11 and 12 below in terms of the operation of the UE.

FIG. 11 is a flowchart for describing a method for transmitting, by a UE, a physical uplink shared channel according to an embodiment of the present disclosure.

Referring to FIG. 11, a method for transmitting, by a user equipment (UE), a Physical Uplink Shared Channel (PUSCH) according to an embodiment of the present disclosure includes receiving PUSCH configuration information (S1110), receiving PUSCH scheduling information (S1120), and transmitting the PUSCH (S1130).

In S1110, the UE receives configuration information related to the transmission of the PUSCH from a base station. The configuration information related to the transmission of the PUSCH may include a port number P of a specific resource to be described below.

According to S1110 described above, an operation of the UE (100/200 in FIGS. 15 to 19) which receives, from the base station (100/200 in FIGS. 15 to 19), the configuration information of related to the transmission of the PUSCH may be implemented by apparatuses of FIGS. 15 to 19. For example, referring to FIG. 16, one or more processors 102 may control one or more transceivers 106 and/or one or more memories 104 so as to receive, from the base station 200, the configuration information related to the transmission of the PUSCH.

In S1120, the UE receives, from the base station, downlink control information scheduling the PUSCH. The downlink control information includes information representing a downlink reference signal (DL RS) related to a beam for the transmission of the PUSCH.

According to an embodiment, the information representing the DL RS may be a channel state information reference signal (CSI-RS) resource indicator (CRI) or an SS bloc resource indicator (SSBRI).

According to S1120 described above, an operation of the UE (100/200 in FIGS. 15 to 19) which receives, from the base station (100/200 in FIGS. 15 to 19), the downlink control information scheduling the PUSCH may be implemented by the apparatuses of FIGS. 15 to 19. For example, referring to FIG. 16, one or more processors 102 may control one or more transceivers 106 and/or one or more memories 104 so as to receive, from the base station 200, the downlink control information scheduling the PUSCH.

In S1130, the UE transmits, to the base station, the PUSCH by using the beam.

According to an embodiment, the transmission of the PUSCH is based on port virtualization applied to most recent sounding reference signal (SRS) transmission in a specific resource. The specific resource is an SRS resource in which the DL RS is configured as spatial related information.

According to an embodiment, the most recent SRS transmission may be performed within a preconfigured time duration having a current timing as an end point. This is to exclude application of SRS transmission of which time excessively elapsed. That is, when the most recent SRS transmission is performed before a start point of the pre-configured time duration, the most recent SRS transmission is excluded from application of port virtualization of the PUSCH transmission.

According to an embodiment, the SRS resource may belong to an SRS resource set in which a higher layer parameter usage is configured as beam management. The SRS for the beam management is used in the PUSCH scheduling, so a configuration of an SRS resource set in which a higher layer parameter usage is set to 'codebook' and the resulting transmission of the SRS may be skipped. Accordingly, there is an effect of latency and overhead reduction as compared with the legacy scheme.

According to an embodiment, when there is a plurality of SRS resources, the port virtualization may be applied based on the SRS transmission in an SRS resource having an index according to a specific reference among the plurality of SRS resources. As an example, the index according to the specific criterion may be a lowest index or a highest index.

According to an embodiment, the beam is a beam corresponding to a beam receiving the DL RS.

According to S1130 described above, an operation of the UE (100/200 in FIGS. 15 to 19) which transmits, to the base station (100/200 in FIGS. 15 to 19), the PUSCH by using the beam may be implemented by the apparatuses of FIGS. 15 to 19. For example, referring to FIG. 16, one or more processors 102 may control one or more transceivers 106 and/or one or more memories 104 so as to transmit, to the base station 200, the PUSCH by using the beam.

FIG. 12 is a flowchart for describing a method for transmitting, by a UE, a physical uplink shared channel according to another embodiment of the present disclosure.

Referring to FIG. 12, a method for transmitting, by a UE, a Physical Uplink Shared Channel (PUSCH) according to another embodiment of the present disclosure includes transmitting UE capability performance (S1210), receiving PUSCH configuration information (S1220), receiving PUSCH scheduling information (S1230), and transmitting the PUSCH (S1240). Since S1220 to S1240 above are the same as S1110 to S1130 of FIG. 11, a duplicated description is skipped.

In S1210, the UE transmits, to the base station, UE capability information related to the antenna port number Q of the UE. The antenna port number Q may mean any one number of the number of Tx chains, antennas (groups), or ports which is involved in the PUSCH transmission.

According to S1210 described above, an operation of the UE (100/200 in FIGS. 15 to 19) which transmits, to the base station (100/200 in FIGS. 15 to 19), UE capability information related to the antenna port number Q of the UE may be implemented by the apparatuses of FIGS. 15 to 19. For example, referring to FIG. 16, one or more processors 102 may control one or more transceivers 106 and/or one or more memories 104 so as to transmit UE capability information related to the antenna port number Q of the UE to the base station.

In S1220, the UE receives, from the base station, configuration information related to the transmission of the PUSCH. According to an embodiment, the configuration information may include a port number P of the specific resource. The port number P of the specific resource is equal to or smaller than an antenna port number Q of the UE.

According to S1220 described above, an operation of the UE (100/200 in FIGS. 15 to 19) which receives, from the base station (100/200 in FIGS. 15 to 19), the configuration information of related to the transmission of the PUSCH may be implemented by the apparatuses of FIGS. 15 to 19. For example, referring to FIG. 16, one or more processors 102 may control one or more transceivers 106 and/or one or more memories 104 so as to receive, from the base station 200, the configuration information related to the transmission of the PUSCH.

In S1230, the UE receives, from the base station, downlink control information scheduling the PUSCH. The downlink control information includes information representing a downlink reference signal (DL RS) related to a beam for the transmission of the PUSCH.

According to an embodiment, the downlink control information may include at least one of a transmit precoding matrix indicator (TPMI) or a transmit rank indicator (TRI).

According to S1230 described above, an operation of the UE (100/200 in FIGS. 15 to 19) which receives, from the base station (100/200 in FIGS. 15 to 19), the downlink control information scheduling the PUSCH may be implemented by the apparatuses of FIGS. 15 to 19. For example, referring to FIG. 16, one or more processors 102 may control one or more transceivers 106 and/or one or more memories 104 so as to receive, from the base station 200, the downlink control information scheduling the PUSCH.

In S1240, the UE transmits the PUSCH by using the beam.

According to an embodiment, when the port number P of the specific resource is smaller than the antenna port number Q of the UE, the port virtualization related to the transmission of the PUSCH is performed based on an operation of multiplying a Q×P matrix related to generation of P ports from Q ports by a P×L precoding matrix.

According to an embodiment, the Q×P matrix may be the same as a Q×P matrix according to port virtualization applied to SRS transmission in the SRS resource.

According to an embodiment, the P×L precoding matrix may be based on the scheduling information. The downlink control information may include at least one of a transmit precoding matrix indicator (TPMI) or a transmit rank indicator (TRI).

According to S1240 described above, an operation of the UE (100/200 in FIGS. 15 to 19) which transmits, to the base station (100/200 in FIGS. 15 to 19), the PUSCH by using the beam may be implemented by the apparatuses of FIGS. 15 to 19. For example, referring to FIG. 16, one or more processors 102 may control one or more transceivers 106 and/or one or more memories 104 so as to transmit, to the base station 200, the PUSCH by using the beam.

The above-described embodiments will be described in detail with reference to FIGS. 13 and 14 below in terms of the operation of the base station.

FIG. 13 is a flowchart for describing a method for receiving, by a base station, a physical uplink shared channel according to an embodiment of the present disclosure.

Referring to FIG. 13, a method for receiving, by a base station, a Physical Uplink Shared Channel (PUSCH) according to an embodiment of the present disclosure includes transmitting PUSCH configuration information (S1310), transmitting PUSCH scheduling information (S1320), and receiving the PUSCH (S1330).

In S1310, the base station transmits, to a UE, configuration information related to the transmission of the PUSCH. The configuration information related to the transmission of the PUSCH may include a port number P of a specific resource to be described below.

According to S1310 described above, the operation of the base station (100/200 in FIGS. 15 to 19) which transmits, to the UE (100/200 in FIGS. 15 to 19), the configuration information of related to the transmission of the PUSCH may be implemented by the apparatuses of FIGS. 15 to 19. For example, referring to FIG. 16, one or more processors 202 may control one or more transceivers 206 and/or one or more memories 204 so as to transmit, to the UE 100, the configuration information related to the transmission of the PUSCH.

In S1320, the base station transmits, to the UE, downlink control information scheduling the PUSCH. The downlink control information includes information representing a downlink reference signal (DL RS) related to a beam for the transmission of the PUSCH.

According to an embodiment, the information representing the DL RS may be a channel state information reference signal (CSI-RS) resource indicator (CRI) or an SS block resource indicator (SSBRI).

According to S1320 described above, an operation of the base station (100/200 in FIGS. 15 to 19) which transmits, to the UE (100/200 in FIGS. 15 to 19), the downlink control information scheduling the PUSCH may be implemented by the apparatuses of FIGS. 15 to 19. For example, referring to FIG. 16, one or more processors 202 may control one or more transceivers 206 and/or one or more memories 204 so as to transmit, to the UE 100, the configuration information related to the transmission of the PUSCH.

In S1330, the base station receives, from the UE, the PUSCH transmitted by using the beam.

According to an embodiment, the base station may be configured to perform the transmission of the PUSCH based on port virtualization applied to most recent sounding reference signal (SRS) transmission in a specific resource. The specific resource is an SRS resource in which a DL RS which is the same as the DL RS is configured as spatial related information.

According to an embodiment, the most recent SRS transmission may be performed within a preconfigured time duration having a current timing as an end point. This is to exclude application of SRS transmission of which time excessively elapsed. That is, when the most recent SRS transmission is performed before a start point of the preconfigured time duration, the most recent SRS transmission is excluded from application of port virtualization of the PUSCH transmission.

According to an embodiment, the SRS resource may belong to an SRS resource set in which a higher layer parameter usage is configured as beam management. The SRS for the beam management is used in the PUSCH scheduling, so a configuration of an SRS resource set in which a higher layer parameter usage is set to 'codebook' and the resulting transmission of the SRS may be skipped. Accordingly, there is an effect of latency and overhead reduction as compared with the legacy scheme.

According to an embodiment, when there is a plurality of SRS resources, the base station may configure, in the UE, so as to apply the port virtualization based on SRS transmission in an SRS resource having an index according to a specific criterion among the plurality of SRS resources. As an example, the index according to the specific criterion may be a lowest index or a highest index.

According to an embodiment, the beam is a beam corresponding to a beam receiving the DL RS.

According to S1330 described above, an operation of the base station (100/200 in FIGS. 15 to 19) which receives, from the UE (100/200 in FIGS. 15 to 19), the PUSCH transmitted by using the beam may be implemented by the apparatuses of FIGS. 15 to 19. For example, referring to FIG. 16, one or more processors 202 may control one or more transceivers 206 and/or one or more memories 204 so as to receive, from the UE 100, the PUSCH transmitted by the beam corresponding to the beam receiving the DL RS.

FIG. 14 is a flowchart for describing a method for receiving, by a base station, a physical uplink shared channel according to another embodiment of the present disclosure.

Referring to FIG. 14, a method for receiving, by a base station, a Physical Uplink Shared Channel (PUSCH) according to another embodiment of the present disclosure includes receiving UE capability information (S1410), transmitting PUSCH configuration information (S1420), transmitting PUSCH scheduling information (S1430), and transmitting the PUSCH (S1440). Since S1420 to S1240 above are the same as S1310 to S1330 of FIG. 13, a duplicated description is skipped.

In S1410, the base station receives, from a UE, UE capability information related to an antenna port number Q of the UE. The antenna port number Q may mean any one number of the number of Tx chains, antennas (groups), or ports which is involved in the PUSCH transmission.

According to S1410 described above, an operation of the base station (100/200 in FIGS. 15 to 19) which receives, from the UE (100/200 in FIGS. 15 to 19), the UE capability information related to the antenna port number Q of the UE may be implemented by the apparatuses of FIGS. 15 to 19. For example, referring to FIG. 16, one or more processors 202 may control one or more transceivers 206 and/or one or more memories 204 so as to receive the UE capability information related to the antenna port number Q of the UE from the UE.

In S1420, the base station transmits, to the UE, configuration information related to the transmission of the PUSCH. According to an embodiment, the configuration information may include the port number P of the specific resource. The port number P of the specific resource is equal to or smaller than an antenna port number Q of the UE.

According to S1420 described above, an operation of the base station (100/200 in FIGS. 15 to 19) which transmits, to the UE (100/200 in FIGS. 15 to 19), the configuration information of related to the transmission of the PUSCH may be implemented by the apparatuses of FIGS. 15 to 19. For example, referring to FIG. 16, one or more processors 202 may control one or more transceivers 206 and/or one or more memories 204 so as to transmit, to the UE 100, the configuration information related to the transmission of the PUSCH.

In S1430, the base station transmits, to the UE, downlink control information scheduling the PUSCH. The downlink control information includes information representing a downlink reference signal (DL RS) related to a beam for the transmission of the PUSCH.

According to an embodiment, the downlink control information may include at least one of a transmit precoding matrix indicator (TPMI) or a transmit rank indicator (TRI).

According to S1430 described above, an operation of the base station (100/200 in FIGS. 15 to 19) which transmits, to the UE (100/200 in FIGS. 15 to 19), the downlink control information scheduling the PUSCH may be implemented by the apparatuses of FIGS. 15 to 19. For example, referring to FIG. 16, one or more processors 202 may control one or more transceivers 206 and/or one or more memories 204 so as to transmit, to the UE 100, the configuration information related to the transmission of the PUSCH.

In S1440, the base station receives, from the UE, the PUSCH transmitted by using the beam.

According to an embodiment, the base station may configure the UE to operate as follows in applying the port virtualization related to the transmission of the PUSCH. Specifically, when the port number P of the specific resource is smaller than the antenna port number Q of the UE, the base station may be configured to perform the port virtualization related to the transmission of the PUSCH based on an operation of multiplying a Q×P matrix related to generation of P ports from Q ports by a P×L precoding matrix.

According to an embodiment, the Q×P matrix may be the same as a Q×P matrix according to port virtualization applied to SRS transmission in the SRS resource.

According to an embodiment, the P×L precoding matrix may be based on the scheduling information. The downlink control information may include at least one of a transmit precoding matrix indicator (TPMI) or a transmit rank indicator (TRI).

According to S1440 described above, an operation of the base station (100/200 in FIGS. 15 to 19) which receives, from the UE (100/200 in FIGS. 15 to 19), the PUSCH transmitted by using the beam may be implemented by the apparatuses of FIGS. 15 to 19. For example, referring to FIG. 16, one or more processors 202 may control one or more transceivers 206 and/or one or more memories 204 so as to receive, from the UE 100, the PUSCH transmitted by the beam corresponding to the beam receiving the DL RS.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 15 illustrates a communication system 1 applied to the present disclosure.

Referring to FIG. 15, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 17 illustrates a signal process circuit for a transmission signal.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT)

for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 18 illustrates another example of a wireless device applied to the present disclosure.

The wireless device may be implemented in various forms according to a use-case/service (refer to FIG. 15). Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 19 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the method for transmitting and receiving the PUSCH in the wireless communication system and the apparatus therefor according to an embodiment of the present disclosure are described below.

According to an embodiment of the present disclosure, scheduling information of a PUSCH includes information representing a downlink reference signal (DL RS) related to a beam for transmission of the PUSCH. The PUSCH is transmitted by using the beam, and as a result, beam correspondence can be used in the PUSCH transmission.

Further, according to an embodiment of the present disclosure, a UE transmits the PUSCH based on port virtualization applied to most recent SRS transmission in a specific resource. The specific resource is an SRS resource in which the DL RS is configured as spatial related information. Accordingly, when an uplink beam is indicated through the DL RS, a mismatch of a modulation coding scheme (MCS)/precoder can be prevented.

Further, according to an embodiment of the present disclosure, the UE transmits UE capability information related to an antenna port number Q. When a port number P of the specific resource is smaller than the antenna port number Q, the port virtualization is performed based on an operation process called an inter-specific matrix multiplication. Therefore, in performing the PUSCH transmission, an operation of a part corresponding to a UE implementation region is explicitly defined/configured to remove ambiguity of a UE operation.

Further, according to an embodiment of the present disclosure, the SRS resource belongs to an SRS resource set in which a higher layer parameter usage is configured as beam management. In the case of a legacy scheme, an SRS resource set in which the upper layer parameter usage is configured as a codebook in order to indicate the beam related to the PUSCH transmission, and as a result, an SRS should be transmitted. According to the embodiment, the SRS for beam management is used, and as a result, the above-described processes may be omitted. Accordingly, there is an effect of latency and overhead reduction.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method for transmitting, by a user equipment (UE), a Physical Uplink Shared Channel (PUSCH) in a wireless communication system, the method comprising:
receiving configuration information related to transmission of the PUSCH;
receiving downlink control information scheduling the PUSCH, the downlink control information including information representing a downlink reference signal (DL RS) related to a beam for transmission of the PUSCH; and
transmitting the PUSCH by using the beam,
wherein the transmission of the PUSCH is based on port virtualization applied to most recent recently transmitted sounding reference signal (SRS) in a specific resource,
wherein the specific resource is an SRS resource in which the DL RS is configured as spatial related information, and
wherein the port virtualization is applied based on a first matrix determined by a number of antenna ports of the UE×a number of ports of the specific resource, related to generation of the number of antenna ports from the number of ports of the specific resource.

2. The method of claim 1, wherein the information representing the DL RS is a channel state information-reference signal resource indicator (CRI) or an synchronization signal block resource indicator (SSBRI).

3. The method of claim 1, wherein the most recently transmitted SRS is performed within a preconfigured time duration having a current time as an end point.

4. The method of claim 1, wherein the SRS resource belongs to an SRS resource set in which a higher layer parameter usage is configured as beam management.

5. The method of claim 4, wherein when there is a plurality of SRS resources, the port virtualization is applied based on the SRS transmission in an SRS resource having an index according to a specific criterion among the plurality of SRS resources.

6. The method of claim 1, further comprising:
transmitting UE capability information related to the number of antenna ports of the UE.

7. The method of claim 6, wherein the configuration information includes the number of ports of the specific resource, and
wherein the number of ports of the specific resource is equal to or smaller than the number of antenna ports of the UE.

8. The method of claim 7, wherein based on that the number of ports of the specific resource is smaller than the number of antenna ports of the UE, the port virtualization related to the transmission of the PUSCH is performed based on an operation of multiplying the first matrix by a second matrix determined by the number of ports of the specific resource×a number of layers.

9. The method of claim 8, wherein the second matrix is based on the scheduling information, and
wherein the downlink control information includes at least one of a transmit precoding matrix indicator (TPMI) or a transmit rank indicator (TRI).

10. The method of claim 1, wherein the beam is a beam corresponding to a beam receiving the DL RS.

11. A UE for transmitting a Physical Uplink Shared Channel (PUSCH) in a wireless communication system, the UE comprising:
one or more transceivers;
one or more processors; and
one or more memories operably connected to the one or more processors, and storing instructions, when executed by the one or more processors, which configure the one or more processors to perform operations,
wherein the operations include
receiving configuration information related to transmission of the PUSCH,
receiving downlink control information scheduling the PUSCH, the downlink control information including information representing a downlink reference signal (DL RS) related to a beam for transmission of the PUSCH; and
transmitting the PUSCH by using the beam,
wherein the transmission of the PUSCH is based on port virtualization applied to most recently transmitted sounding reference signal (SRS) in a specific resource,
wherein the specific resource is an SRS resource in which the DL RS is configured as spatial related information, and
wherein the port virtualization is applied based on a first matrix determined by a number of antenna ports of the UE×a number of ports of the specific resource, related to generation of the number of antenna ports from the number of ports of the specific resource.

12. The UE of claim 11, wherein the information representing the DL RS is a channel state information-reference signal resource indicator (CRI) or an synchronization signal block resource indicator (SSBRI).

13. The UE of claim 11, wherein the operations further include transmitting UE capability information related to the number of antenna ports of the UE.

14. The UE of claim 13, wherein the configuration information includes the number of ports of the specific resource, and
wherein the number of ports of the specific resource is equal to or smaller than the number of antenna ports of the UE.

15. The UE of claim 14, wherein based that the number of ports of the specific resource is smaller than the number of antenna ports of the UE, the port virtualization related to the transmission of the PUSCH is performed based on an operation of multiplying the first matrix by a second matrix determined by the number of ports of the specific resource×a number of layers.

16. The UE of claim 11, wherein the beam is a beam corresponding to a beam receiving the DL RS.

17. A method for receiving, by a base station, a Physical Uplink Shared Channel (PUSCH) in a wireless communication system, the method comprising:
transmitting configuration information related to transmission of the PUSCH;
transmitting downlink control information scheduling the PUSCH, the downlink control information including information representing a downlink reference signal (DL RS) related to a beam for transmission of the PUSCH; and
receiving the PUSCH transmitted by using the beam,
wherein the transmission of the PUSCH is based on port virtualization applied to most recently transmitted sounding reference signal (SRS) in a specific resource,
wherein the specific resource is an SRS resource in which the DL RS is configured as spatial related information, and
wherein the port virtualization is applied based on a first matrix determined by a number of antenna ports of the UE×a number of ports of the specific resource, related to generation of the number of antenna ports from the number of ports of the specific resource.

* * * * *